(12) United States Patent
Searle et al.

(10) Patent No.: US 10,389,608 B2
(45) Date of Patent: Aug. 20, 2019

(54) NETWORK TRAFFIC MAPPING AND PERFORMANCE ANALYSIS

(71) Applicant: Amazon Technologies, Inc., Reno, NV (US)

(72) Inventors: Ian Roger Searle, Bellevue, WA (US); Peter Nicholas Desantis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 684 days.

(21) Appl. No.: 13/833,945

(22) Filed: Mar. 15, 2013

(65) Prior Publication Data

US 2014/0280884 A1 Sep. 18, 2014

(51) Int. Cl.
*H04L 12/26* (2006.01)

(52) U.S. Cl.
CPC .................. *H04L 43/0864* (2013.01)

(58) Field of Classification Search
CPC ..... H04W 24/08; H04W 24/02; H04W 24/00; H04W 24/06; H04W 72/082; H04W 72/0406; H04W 72/085; H04W 28/21; H04W 28/0289; H04W 28/0231; H04W 28/0263; H04W 28/0284; H04W 36/22; H04W 36/0083; H04W 16/02;
(Continued)

(56) References Cited

U.S. PATENT DOCUMENTS 5,477,531 A 12/1995 McKee et al.
5,812,528 A 9/1998 Vandervort
(Continued)

FOREIGN PATENT DOCUMENTS

| CN | 102598591 | 7/2012 |
|----|-----------|--------|
| CN | 102948132 | 2/2013 |
| JP | 2009-038717 | 2/2009 |

OTHER PUBLICATIONS

Jiang, Hao, and Constantinos Dovrolis. "Passive estimation of TCP round-trip times." ACM SIGCOMM Computer Communication Review 32.3 (2002): pp. 75-88.
(Continued)

*Primary Examiner* — Younes Naji
*Assistant Examiner* — Da T Ton
(74) *Attorney, Agent, or Firm* — Robert C. Kowert; Meyertons, Hood, Kivlin, Kowert & Goetzel, P.C.

(57) ABSTRACT

An overlay network analysis method obtains data including but not limited to client packet traffic data on an overlay network, and performs one or more analyses based on the obtained data to generate and output topological and/or performance information for the overlay network and/or the network substrate on which the overlay network is implemented. Client traffic data collected for specific client resource instances may be analyzed to generate performance metrics for the overlay network between the instances. Aggregated client traffic data for specific clients may also be analyzed to generate mappings of the clients' private network implementations on the overlay network, as well as performance metrics for the clients' private networks on the overlay network. In addition, client traffic data from multiple clients may be aggregated and analyzed to generate mappings and performance metrics for the overlay network as a whole.

30 Claims, 13 Drawing Sheets

(58) Field of Classification Search
CPC . H04W 48/06; H04W 52/241; H04W 52/242;
H04W 52/245; H04W 52/343; H04W
8/005; H04L 5/0048; H04L 5/0035; H04L
5/0053; H04L 5/0005; H04L 5/0023;
H04L 43/08; H04L 43/04; H04L 43/50;
H04L 43/0876; H04L 43/12; H04L
43/062; H04L 43/067; H04L 43/0829;
H04L 43/0847; H04L 43/0894; H04L
67/10; H04L 41/0213; H04L 41/12; H04L
41/142; H04L 41/0226; H04L 41/50;
H04L 41/5096; H04L 47/19; H04L
47/801; H04L 47/822; H04L 47/0246;
H04L 47/30; H04L 12/2834; H04L
12/2832; H04L 12/66; H04L 1/00; H04L
1/0003; H04L 1/1861; H04L 63/10; H04L
29/12424; H04L 29/125; H04B 17/382;
H04B 17/00; H04B 7/0626; H04B
7/0632; H04B 7/005; G06F 11/0709;
G06F 11/079; G06F 13/00; G06F 15/177;
G08G 1/01; H04J 3/1694; H04M
1/72522; H04M 3/22
USPC .............. 709/220–226, 230–238, 244, 250;
370/203, 228–231, 241–249, 252, 400,
370/421
See application file for complete search history.

(56) References Cited

U.S. PATENT DOCUMENTS

| | | | |
|---|---|---|---|
| 8,239,572 | B1 | 8/2012 | Brandwine et al. |
| 8,370,483 | B2 | 2/2013 | Choong et al. |
| 8,787,154 | B1* | 7/2014 | Medved .................. H04L 45/64 370/225 |
| 9,916,545 | B1 | 3/2018 | de Kadt et al. |
| 2002/0026531 | A1 | 2/2002 | Keane et al. |
| 2003/0115338 | A1* | 6/2003 | Jayam ..................... H04L 29/06 709/228 |
| 2004/0236855 | A1* | 11/2004 | Peles ....................... H04L 29/06 709/227 |
| 2007/0086335 | A1 | 4/2007 | McCanne et al. |
| 2008/0225875 | A1 | 9/2008 | Wray et al. |
| 2009/0122697 | A1* | 5/2009 | Madhyasha ......... H04L 12/2697 370/229 |
| 2009/0288084 | A1 | 11/2009 | Astete et al. |
| 2010/0094990 | A1 | 4/2010 | Ben-Yehuda et al. |
| 2011/0022694 | A1 | 1/2011 | Dalal et al. |
| 2011/0185073 | A1 | 7/2011 | Jagadeeswaran et al. |
| 2011/0317580 | A1 | 12/2011 | Kozisek et al. |
| 2012/0096158 | A1 | 4/2012 | Astete et al. |
| 2012/0163388 | A1 | 6/2012 | Goel et al. |
| 2012/0170586 | A1 | 7/2012 | Roberts et al. |
| 2012/0275333 | A1 | 11/2012 | Cociglio |
| 2012/0278477 | A1 | 11/2012 | Terrell et al. |
| 2012/0320784 | A1 | 12/2012 | Edwards et al. |
| 2013/0044625 | A1 | 2/2013 | Luo et al. |
| 2013/0100816 | A1* | 4/2013 | Bergamasco ....... H04L 43/0864 370/237 |
| 2014/0075243 | A1* | 3/2014 | Nagaraj .............. H04L 43/0811 714/32 |
| 2014/0149980 | A1* | 5/2014 | Vittal .................... G06F 9/5072 718/1 |
| 2014/0177460 | A1* | 6/2014 | Keskkula .............. H04L 45/128 370/252 |

OTHER PUBLICATIONS

International Search Report and Written Opinion from PCT/US14/28967, dated Oct. 23, 2014, Amazon Technologies, pp. 1-23.
Extended European Search Report from PCT/US2014/028967, dated Nov. 3, 2016, Amazon Technologies, Inc., pp. 1-10.
Masahiro Satou, et al., "Server Side Networking for Cloud Data Centers", 2012 IEEE 1st International Conference on Cloud Networking (CLOUDNET), Nov. 28, 2012, pp. 17-22.
Kapil Bakshi, "Considerations for Software Defined Networking (SDN): Approaches and Use Cases", Aerospace Conference, 2013 IEEE, Mar. 2, 2013, pp. 1-9.
Office Action from Korean Application No. 10-2015-7029805, dated Oct. 14, 2016 (English translation and Korean version), pp. 1-17.
Office Action from Chinese Patent Application No. 201480023091.9 (English Translation and Chinese Version), dated Dec. 21, 2017, pp. 1-15.
U.S. Appl. No. 15/179,739, filed Jun. 10, 2016, Eric W, Schultze.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhang Mcclenahan.
U.S. Appl. No. 14/736,165, filed Jun. 10, 2015, Calm Maccarthaigh.
U.S. Appl. No. 16/029,468, filed Jul. 6, 2018, Kyle Tailor Akers.
U.S. Appl. No. 14/853,646, filed Sep. 14, 2015, Po-Chun Chen.
U.S. Appl. No. 16/056,078, filed Aug. 6, 2018, Unknown.
U.S. Appl. No. 15/439,751, filed on Mihir Sadruddin Surani.
U.S. Appl. No. 15/632,258, filed on Benjamin David Strauss.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel T. Cohn.
U.S. Appl. No. 14/853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

* cited by examiner

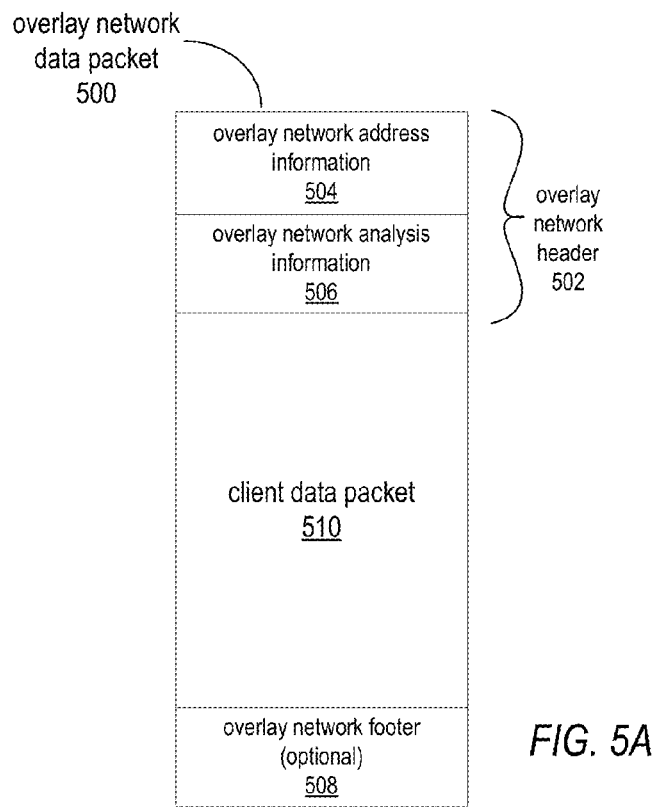
FIG. 5A
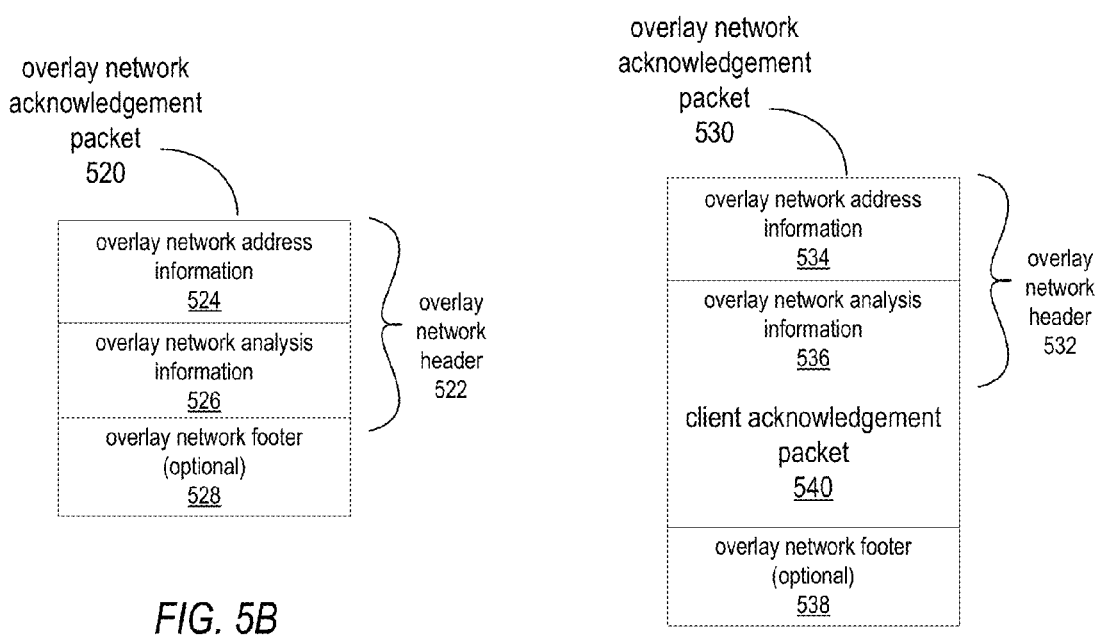
FIG. 5B
FIG. 5C

| resource instance A ⟶ resource instance B data flow 800 | throughput 802 | latency 804 | packet loss rate 806 |
*FIG. 8A*
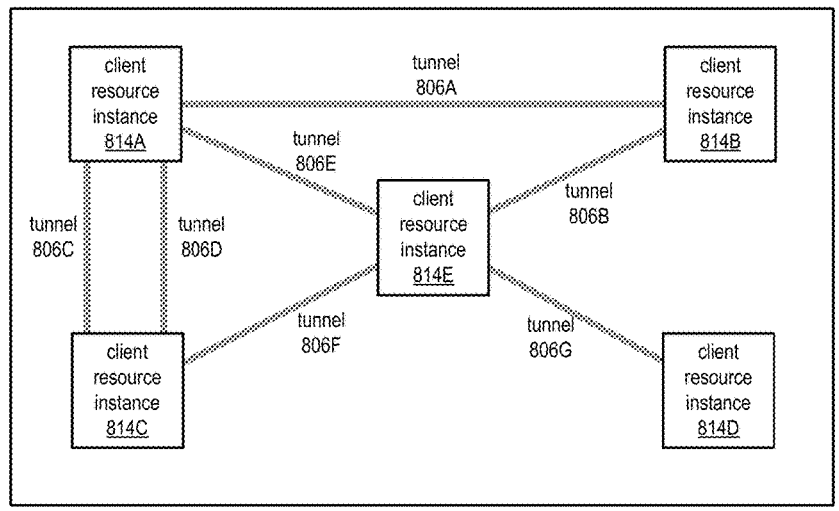
*FIG. 8B*
| VMM A ⟶ VMM B route 830 | throughput 832 | latency 834 | packet loss rate 836 |
*FIG. 8C*
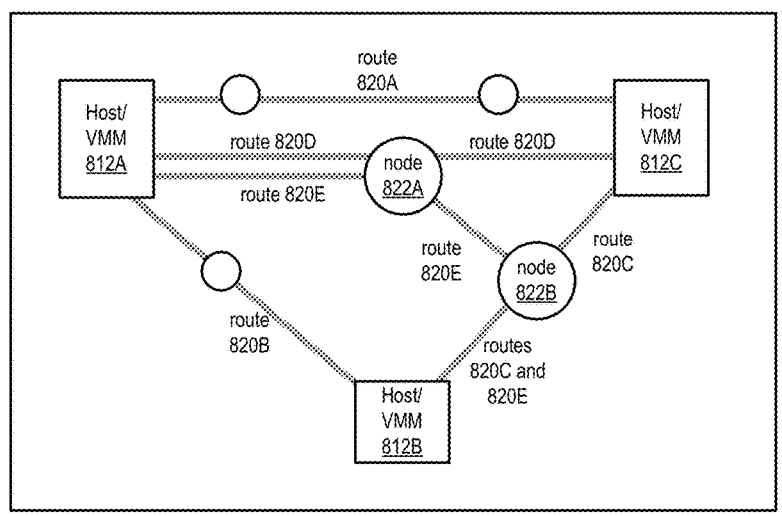
*FIG. 8D*

NETWORK TRAFFIC MAPPING AND PERFORMANCE ANALYSIS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF THE DRAWINGS

FIGS. 5A through 5C illustrate an example overlay network data packet and example overlay network acknowledgement packets, according to at least some embodiments.

FIGS. 8A through 8D illustrate example outputs for an overlay network analysis method, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for network traffic mapping and performance analysis are described. Specifically, embodiments of an overlay network analysis method are described that obtain data including but not limited to client packet traffic data on an overlay network, and perform one or more analyses based on the obtained data to generate and output topological and/or performance information for the overlay network and/or the network substrate on which the overlay network is implemented. Client traffic data collected for specific client resource instances may be analyzed to generate performance metrics for the overlay network between the instances. Aggregated client traffic data for specific clients may also be analyzed to generate mappings of the clients' private network implementations on the overlay network, as well as performance metrics for the clients' private networks on the overlay network. In addition, client traffic data from multiple clients may be aggregated and analyzed to generate mappings and performance metrics for the overlay network as a whole.

Figure 3:
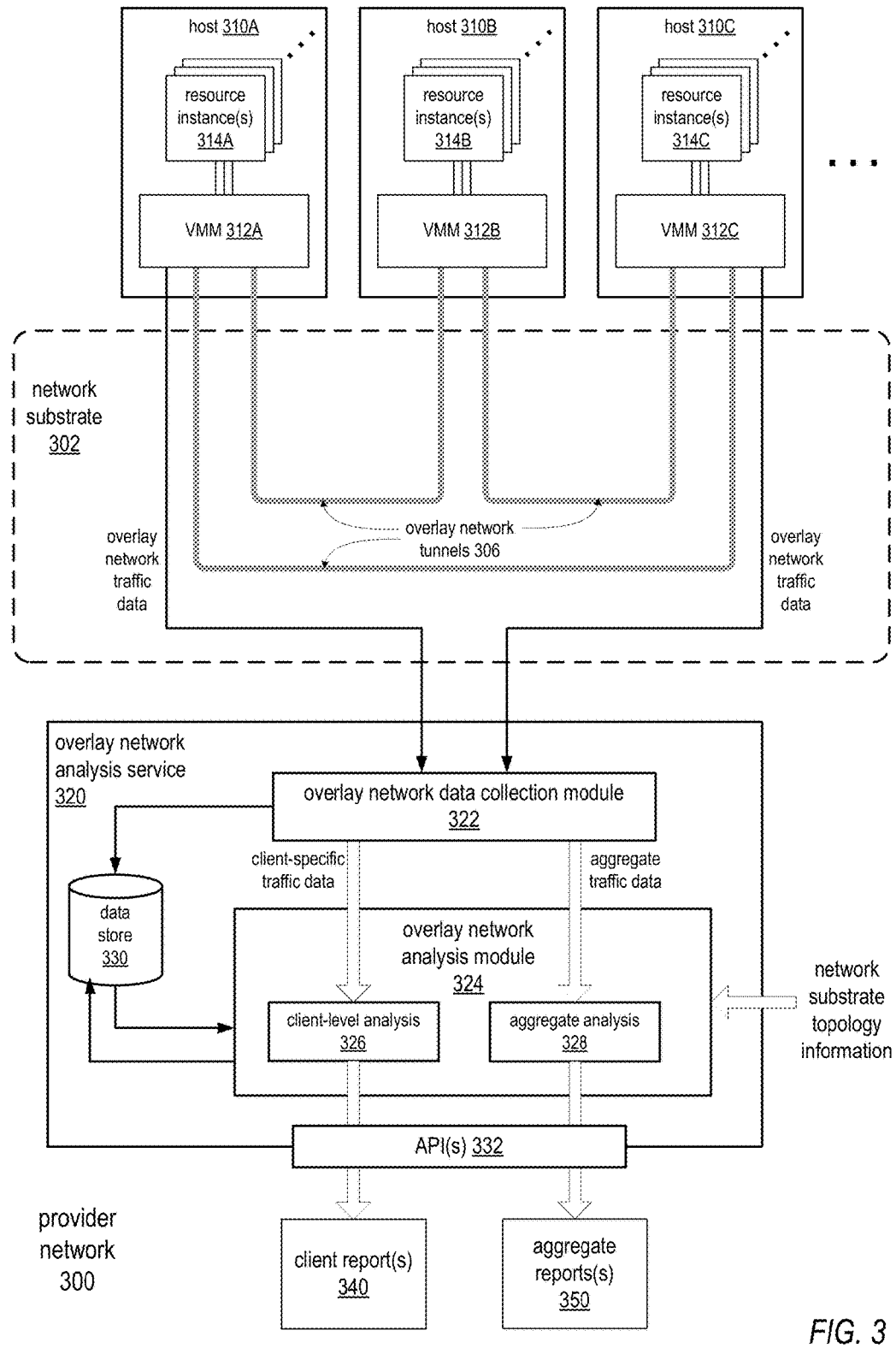
FIG. 3 illustrates an example overlay network analysis service in a provider network environment, according to at least some embodiments.
Figure 13:
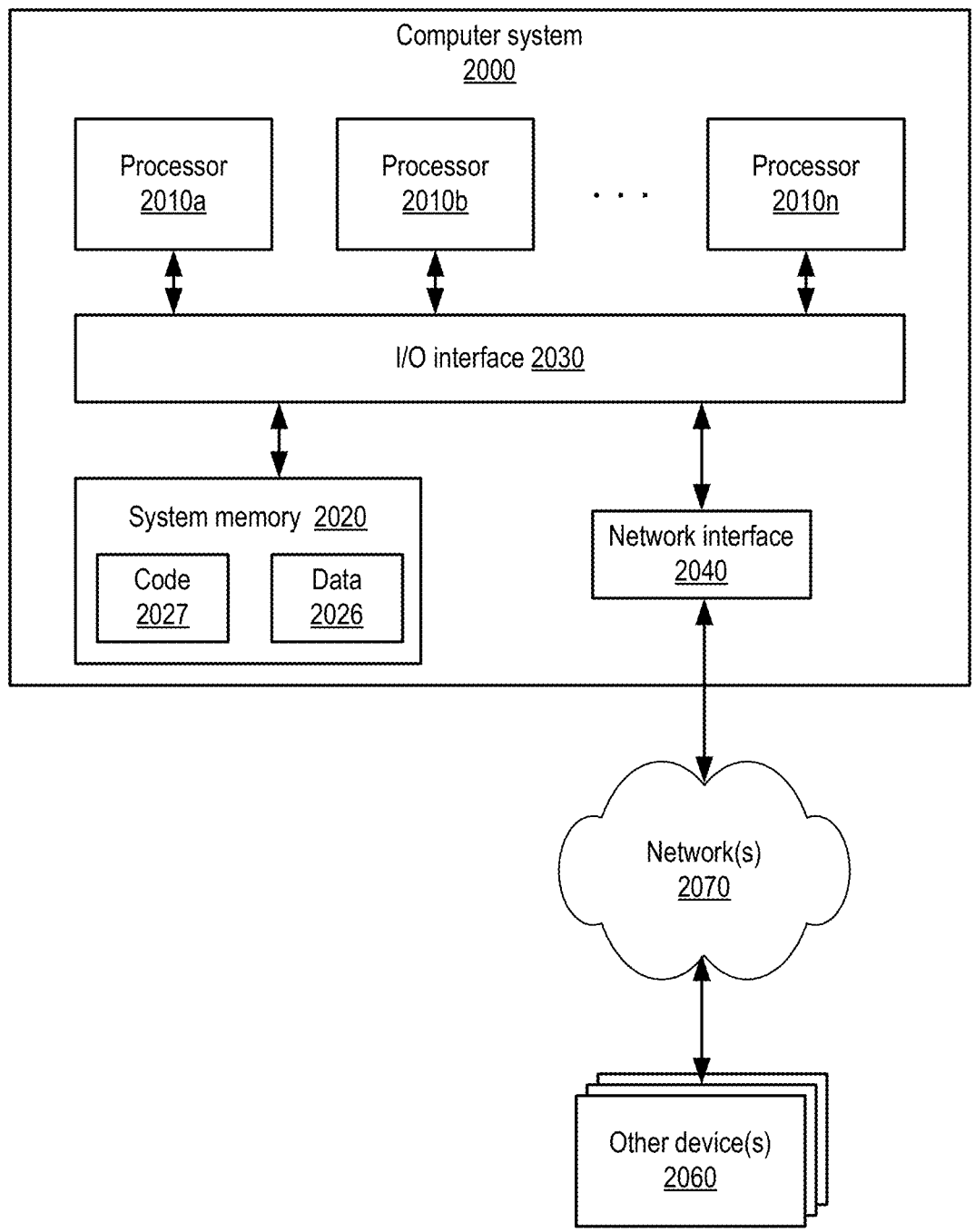
FIG. 13 is a block diagram illustrating an example computer system that may be used in some embodiments.

Embodiments of the overlay network analysis method may be implemented as or in an overlay network analysis module. The overlay network analysis module may be implemented on or by one or more computing systems within a network environment, for example by an overlay network analysis service in a service provider's provider network environment as illustrated in FIG. 3. An example computer system on which embodiments of the overlay network analysis module and/or overlay network analysis service may be implemented is illustrated in FIG. 13.

Figure 11:
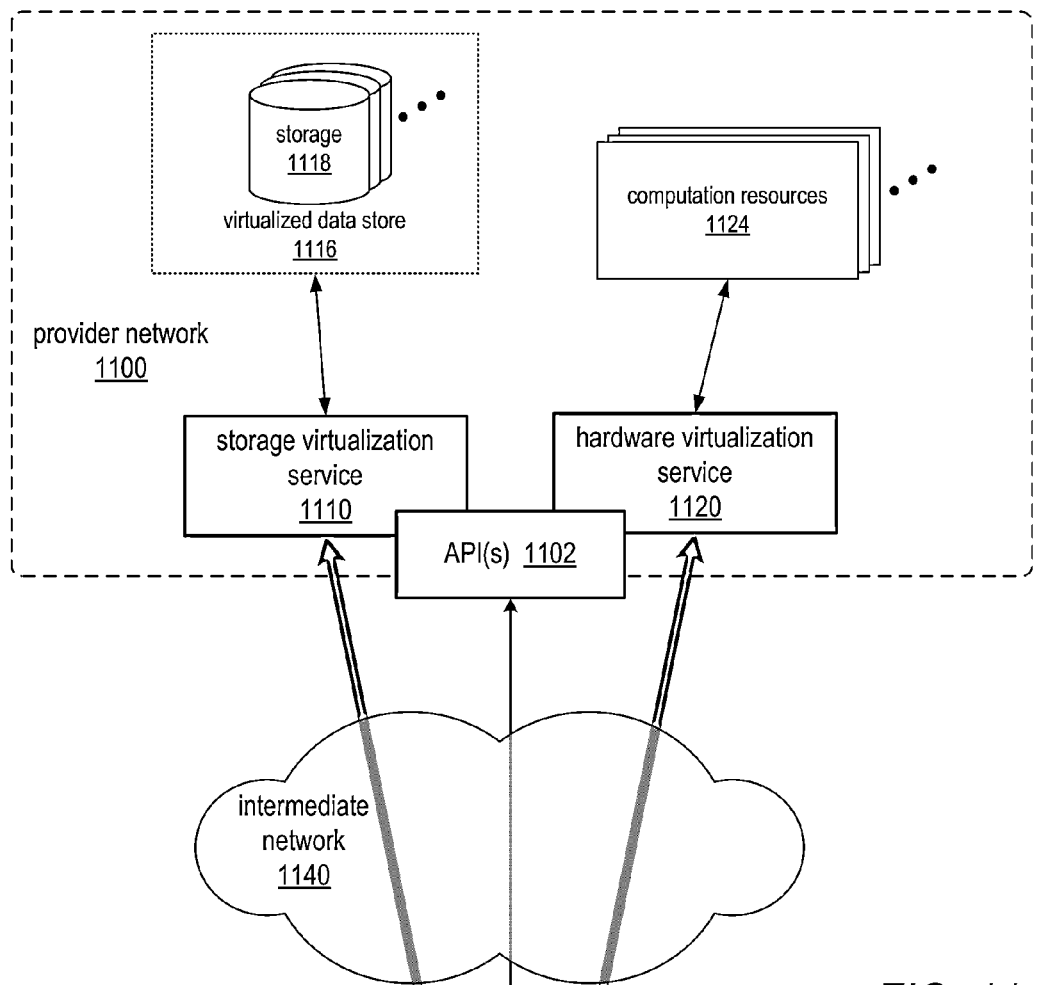
FIG. 11 is a block diagram of an example provider network that provides a storage virtualization service and a hardware virtualization service to clients, according to at least some embodiments.
Figure 11:
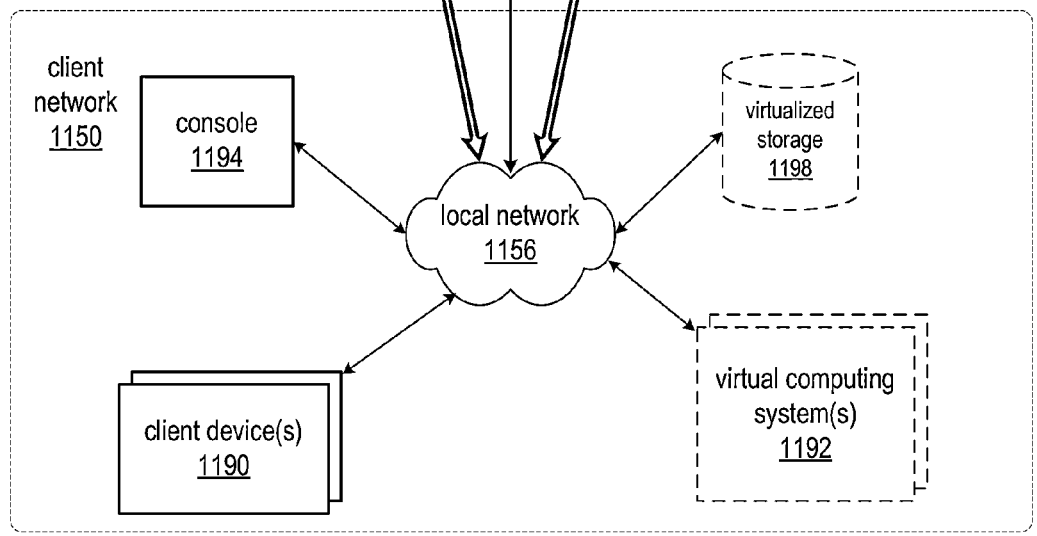
Figure 12:
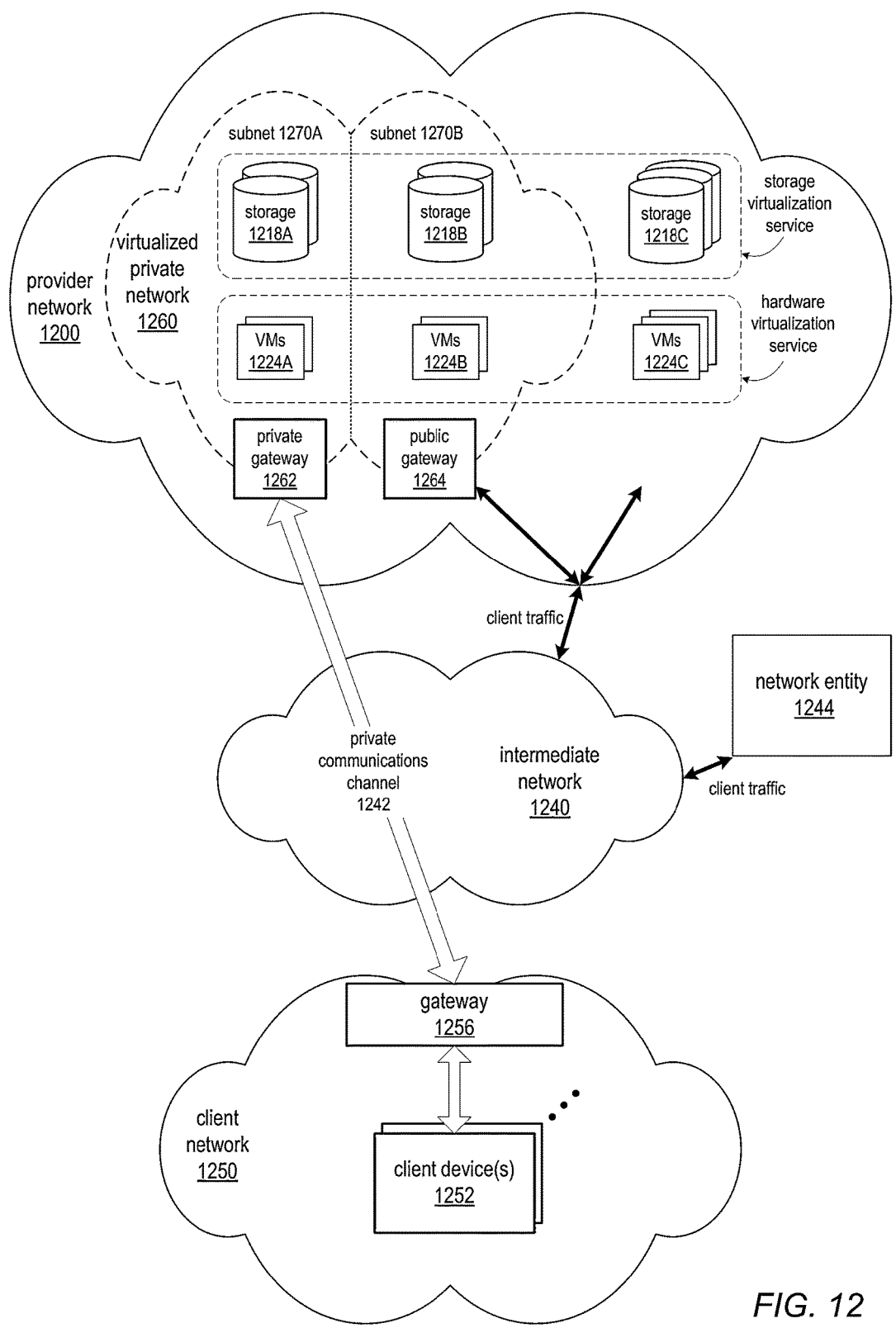
FIG. 12 illustrates an example provider network that provides virtualized private networks to at least some clients, according to at least some embodiments.

Embodiments of the overlay network analysis methods and apparatus are generally described herein in the context of a service provider that provides to clients, via an intermediate network such as the Internet, virtualized resources (e.g., virtualized computing and storage resources) implemented on a provider network of the service provider. FIGS. 9 through 12 and the section titled Example provider network environments illustrate and describe example environments in which embodiments of the methods and apparatus as described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks as illustrated in FIG. 12.

The resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host presents the VMs on the host with a virtual platform and monitors the execution of the VMs. Each VM may be provided with one or more private IP addresses; the VMM on a host may be aware of the private IP addresses of the VMs on the host. For further information on hardware virtualization technology, see FIG. 10.

The VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology provides a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. For further information on overlay network technology, see FIG. 10.

Client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance.

Conventionally, the overlay network is a stateless network implemented according to a connectionless (or stateless) IP protocol. The sending VMM sends the encapsulated packet onto the overlay network for routing and delivery, but does not receive an acknowledgement (ACK) or other response regarding delivery of the packet.

Overlay Network Analysis Method

In at least some embodiments of the overlay network analysis method, to enable the monitoring and analysis of overlay network traffic for performance statistics and other purposes, the overlay network protocol may be extended to include additional information (e.g., acknowledgement flags, timestamps, packet sequence numbers, etc.) in the overlay network protocol packet information. In addition, the overlay network protocol may be extended to enable acknowledgment of received overlay network packets by the VMMs. Thus, after a VMM sends one or more overlay network packets onto the overlay network, the VMM may receive an acknowledgement message or messages from another VMM in response to receipt of the overlay network packet(s). In some embodiments, each overlay network packet may generate an acknowledgement message. Alternatively, only every Nth overlay network packet may generate an acknowledgement message. See FIGS. 5A through 5C for an example overlay network data packet and example overlay network acknowledgement packets, according to at least some embodiments. The extended overlay network protocol may allow performance data such as a traversal time (e.g., round-trip time or one-way traversal time) for packets to be determined and collected from which performance metrics such as average round-trip time, latency, throughput, and packet dropping rate may be determined for specific tunnels or overlay network routes between VMMs.

Aggregated data from multiple VMMs may be analyzed to determine performance statistics, mapping, and/or other information at the client private network level and/or for the overlay network as a whole. In at least some embodiments, the aggregated data from multiple clients, along with topology information for the network substrate, may be analyzed to determine locations or specific components on the network substrate where problems on the overlay network are occurring. In at least some embodiments, a time synchronization technique or technology may be used to synchronize time among the host devices that implement the VMMs so that time-based data and metrics such as round-trip time, throughput, and latency can be accurately calculated.

Figure 1:
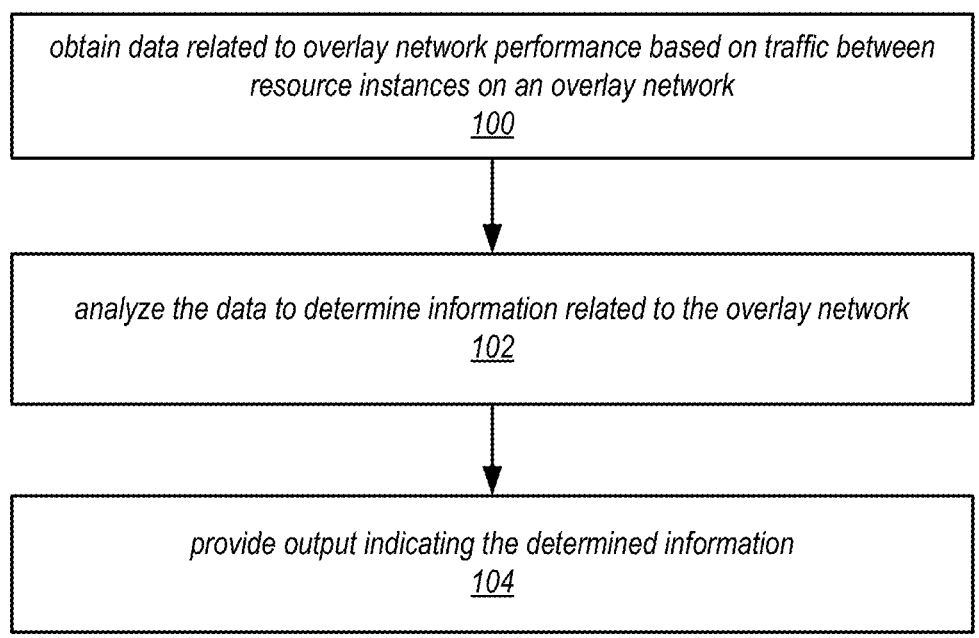
FIG. 1 is a high-level flowchart of an overlay network analysis method, according to at least some embodiments.

FIG. 1 is a high-level flowchart of an overlay network analysis method, according to at least some embodiments. As indicated at 100, data related to overlay network performance based on packet traffic between client resource instances on an overlay network may be obtained, for example from virtual machine monitors (VMMs) on host devices in the provider network. The VMMs may collect data obtained according to the extended overlay network protocol and periodically or aperiodically provide the collected data to an overlay network analysis component. As indicated at 102, the obtained data may be analyzed to determine performance statistics, mapping, and other information for the overlay network. The determined information may include information at the resource instance/tunnel level based on data collected for a particular client resource instance, information at the client level based on data collected for multiple client resource instances/tunnels specific to a client, and/or information at an aggregate level for the overlay network based on data collected for multiple client resource instances/tunnels of multiple clients. As indicated at 104, output may be provided indicating the determined information. The output may include performance statistics and/or mapping output at the client resource instance level, at the client level, and/or at the aggregate level for the overlay network. Elements of the method as illustrated in FIG. 1 are further described below in relation to FIGS. 2 through 13.

Figure 2:
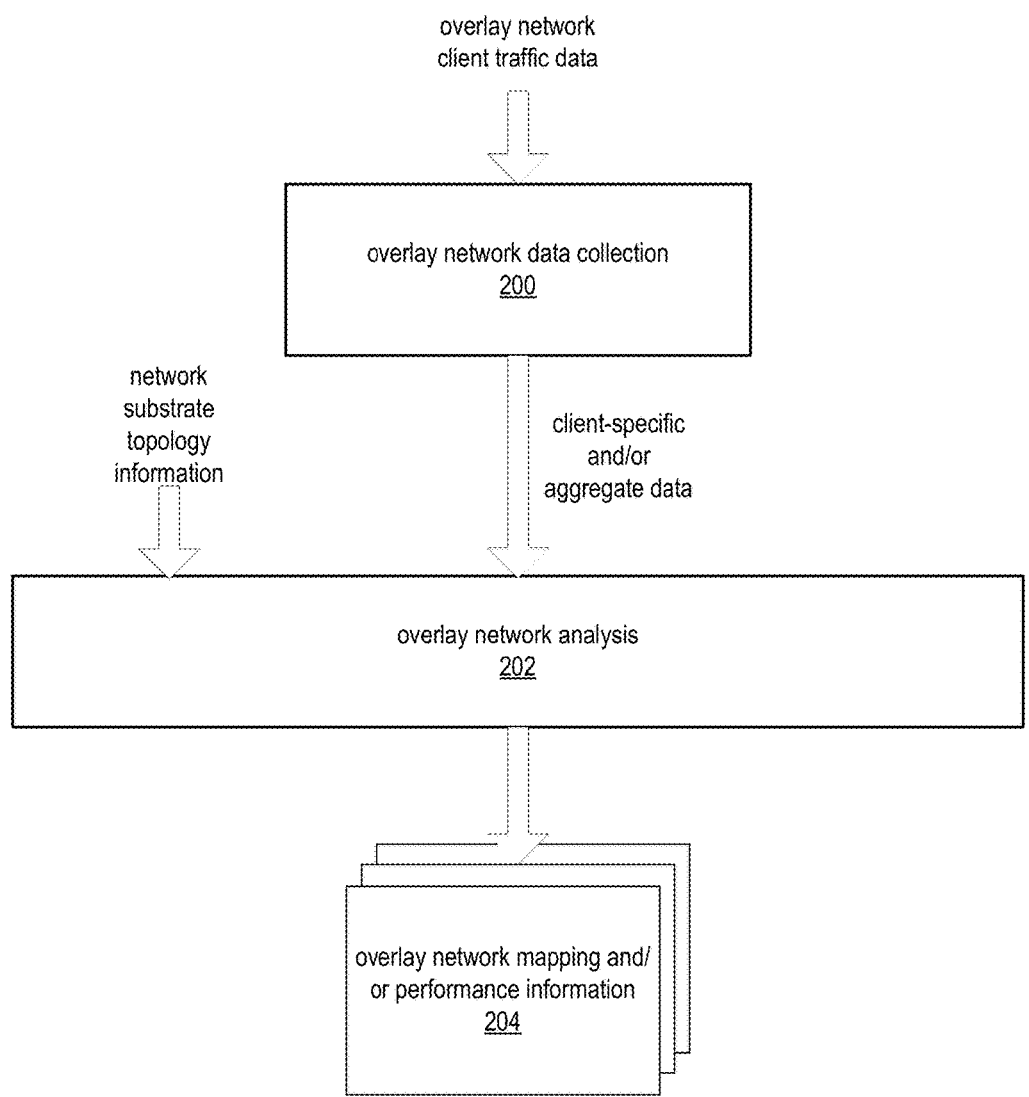
FIG. 2 is a high-level block diagram illustrating data flow in and operations of an overlay network analysis method as illustrated in FIG. 1, according to at least some embodiments.

FIG. 2 is a high-level block diagram illustrating data flow in and operations of an overlay network analysis method as illustrated in FIG. 1, according to at least some embodiments. An overlay network data collection component 200 and an overlay network analysis component 202 may be implemented on a provider network, for example on one or more server systems on the provider network. The overlay network data collection component 200 may obtain data related to overlay network client traffic data flow from one or more sources on the overlay network. For example, in at least some embodiments, virtual machine monitors (VMMs) on host devices in the provider network may each collect overlay network tunnel (or route) traffic data for client traffic originating from client resource instances corresponding to the virtual machines (VMs) at the VMM and periodically or aperiodically provide the collected data to the overlay network data collection component 200. The tunnel traffic data provided to the data collection component 200 by a VMM may be at the packet level for each tunnel, or alternatively may be summary data for multiple packets for each tunnel. In addition, the tunnel traffic data provided to the data collection component 200 by a VMM may be data specific to the resource instances of a particular client, or may be aggregate data collected for the resource instances of multiple clients. The tunnel traffic data may include, but is not limited to, identifying information such as information identifying particular clients and/or particular client resource instances that are sources of or targets for packets, and performance information or metrics such as round-trip time and indications of dropped packets.

The overlay network data collection component 200 may thus obtain data related to the overlay network client traffic data flow on the overlay network tunnels or routes from each VMM on the provider network. The data obtained from each VMM may include data collected for one, two, or more client resource instances at the VMM. The data corresponding to a given client resource instance may include data collected for one or more overlay network tunnels originating at the respective VMM via which client data originating at the client resource instance is sent to another client resource instance at another VMM. In addition, the client resource instances may be implemented on multi-tenant hardware (the host devices or systems) that is shared with other client(s), and thus the data obtained from each VMM may, but does not necessarily, include data collected for two or more different clients of the provider network that have client resource instances implemented on the respective host device.

The overlay network analysis component 202 may obtain packet-level, tunnel-level, or summary data collected from the VMMs by the overlay network data collection component 200. In at least some embodiments, the data collection component 200 may feed collected data directly to the analysis component 202. Alternatively, the collected data may be stored by the data collection component 200 to a memory or data store from which the analysis component 202 may access the data. In at least some embodiments, the analysis component 202 may obtain data specific to a particular resource instance or to a particular client's resources instances, or aggregate data corresponding to the resource instances of two or more, or of all, clients.

In at least some embodiments, the overlay network analysis component 202 may also obtain network substrate topology information from one or more sources. The network substrate topology information may, for example be obtained via user input and/or other sources (e.g., textual or graphical file input). The network substrate topology information may, for example, indicate the physical configuration or layout of the network substrate, as well as information indicating specific components of the network substrate (cable spans, networking devices, etc.) along with location information for each component.

Figure 4:
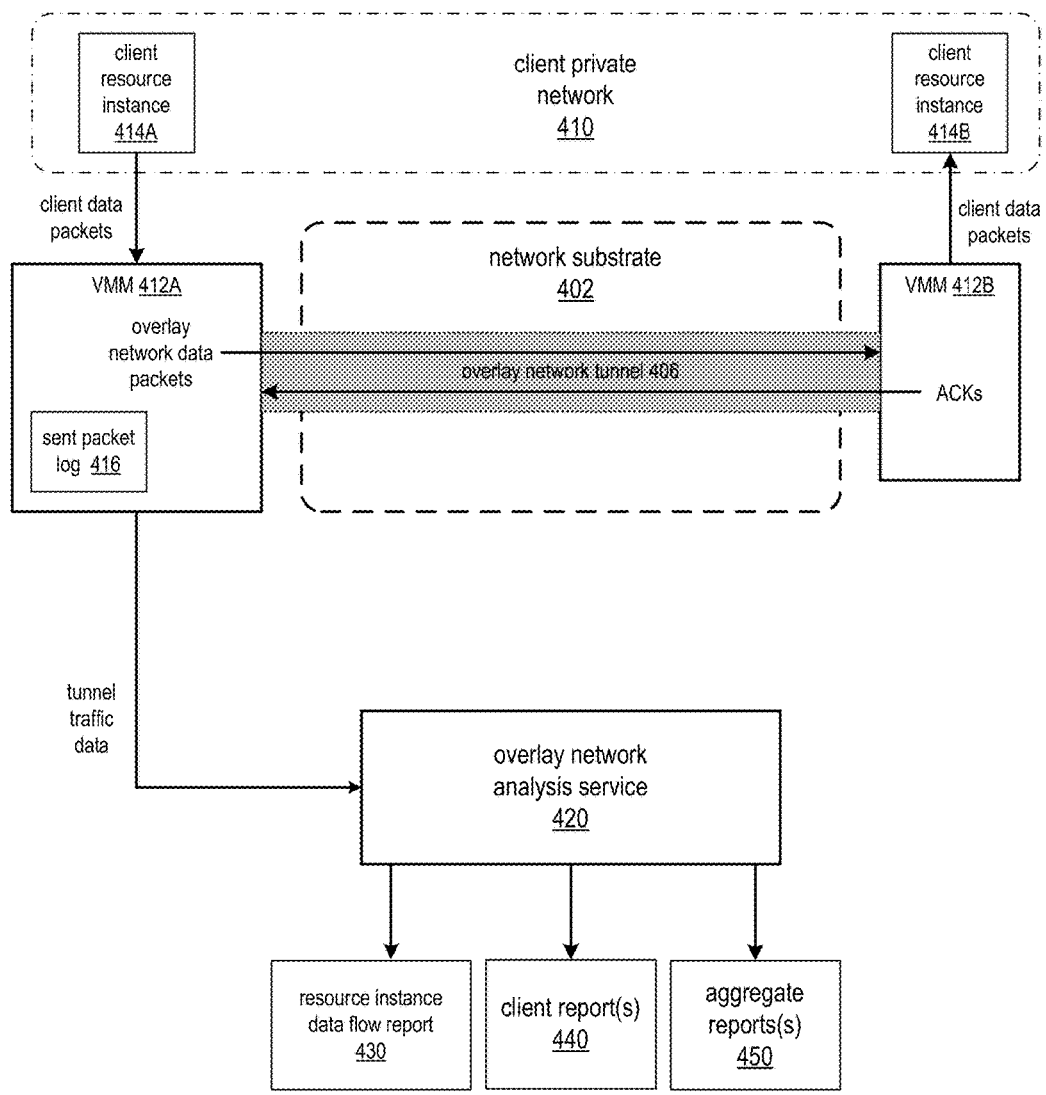
FIG. 4 illustrates obtaining and analyzing performance data for a particular tunnel or route between client resource instances, according to at least some embodiments.

The analysis component 202 may periodically analyze data obtained from the data collection component to generate overlay network mapping and/or performance information 204. In at least some embodiments, analysis may be performed at the client level or at an aggregate (multi-client) level. Client-level analysis may be performed according to data specific to a particular client's resources instances to generate performance, health, and/or other information specific to the client's provider network implementation, for example for a client's virtualized private network as illustrated in FIGS. 4 and 12. In some embodiments, analysis may also be performed at the client resource instance level to generate performance, health, and/or other information specific to a particular overlay network tunnel or tunnels between specific client resource instances in a client's provider network implementation.

Aggregate analysis may be performed according to aggregate data corresponding to the resource instances of two or more clients to generate performance, health, network mapping, and/or other information for the overlay network as a whole. In addition, aggregate analysis may be performed to determine performance metrics for components of the physical network substrate on which the virtualized overlay network is implemented. In the latter case, the overlay network analysis component 202 may use the aggregate data from multiple tunnels associated with multiple clients along with network substrate topology information to locate problem spots in the network substrate, for example network components (routers, switches, cables, etc.) that are causing delays and/or resulting in dropped packets on the overlay network.

In at least some embodiments, client-level overlay network mapping and/or performance information 204 generated by the overlay network analysis component 202 may be provided to respective clients, for example via one or more APIs provided by an overlay network analysis service 320 as illustrated in FIG. 3. As an example, the client-level information 204 for a particular client's private network implementation on the provider network may be provided to and displayed on a device on the client's external network, for example a console 1194 on client network 1150 as illustrated in FIG. 11, for viewing by agent(s) of the client. In at least some embodiments, client-level information 204 for one or more clients may also be accessed by agents (e.g., network administrators or engineers) of the service provider via devices, e.g. network management consoles, on the provider network. Aggregate-level overlay network mapping and/or performance information 204 generated by the overlay network analysis component 202 may be provided to agents (e.g., network administrators or engineers) of the service provider via devices, e.g. network management consoles, on the provider network, for example via one or more APIs provided by an overlay network analysis service 320 as illustrated in FIG. 3. In some embodiments, aggregate-level (multi-client) information may not be provided to individual clients. In other embodiments, at least some aggregate-level information may in at least some case be made accessible to the clients, for example via the API(s) to the service.

In at least some embodiments, overlay network information 204 may be provided via dynamic displays that are periodically or aperiodically updated to report newly analyzed client-specific or aggregate information. Instead or in addition, the overlay network information 204 may be generated as periodic or aperiodic reports, or may be generated at the request of an agent of the provider network or an agent of a client via the API(s) to the service. FIGS. 8A through 8D show examples of client-level and aggregate reports.

Overlay Network Analysis Service

In at least some embodiments, overlay network traffic mapping and performance analysis as described herein may be provided by an overlay network analysis service of a service provider's provider network environment. FIG. 3 illustrates an example overlay network analysis service in a provider network environment, according to at least some embodiments. Example provider network environments are further illustrated in FIGS. 9 through 12. An example computer system on which the overlay network analysis service or components thereof may be implemented is illustrated in FIG. 13.

Referring to FIG. 3, each virtual machine monitor (VMM) 312 monitors multiple virtual machines (VMs) on a respective host 310 device in the provider network 300. Client resource instances 314 may be implemented on the VMs, with one client resource instance 314 per VM. Note that the hosts 310 may be multi-tenant hardware that is shared by two or more clients of the service provider. Thus, a given host 310 may host client resource instances 314 for two or more different clients of the service provider, and a VMM 312 on the host 310 may monitor VMs that implement client resource instances 314 of two or more different clients. The VMMs 312 may function as intermediaries between the client resource instances 314 and an overlay network on a network substrate 302, for example an overlay network implemented according to Internet Protocol (IP) tunneling technology.

In at least some embodiments, to enable the monitoring and analysis of overlay network traffic for performance statistics and other purposes, the overlay network protocol may be extended to include additional information (e.g., acknowledgement flags, timestamps, packet sequence numbers, etc.) in the overlay network protocol packet information. In addition, in at least some embodiments, the overlay network protocol may be extended to enable acknowledgment of received overlay network packets by the VMMs 312. The extended overlay network protocol may allow performance data such as round-trip time for packets to be determined and collected from which performance metrics such as average round-trip time, throughput, and latency can be determined for tunnels between specific client resource instances 314. Aggregated data from multiple VMMs 312 may be analyzed to determine performance statistics, mapping, and/or other information at the client private network level and/or for the overlay network as a whole. In at least some embodiments, aggregated data from multiple clients, along with topology information for the network substrate, may be analyzed to determine locations or specific components on the network substrate where problems on the overlay network are occurring. In at least some embodiments, a time synchronization technique or technology may be used to synchronize time among the hosts 310 that implement the VMMs 312 so that time-based metrics such as round-trip time, throughput, and latency can be accurately calculated.

A VMM 312 may receive client data packets (e.g., TCP or UDP packets) from one or more client resource instances 314 on the host 310. For example, VMM 312A may receive client data packets from resource instance(s) 314A on host 310A. At least some of the client data packets may be targeted at other client resource instances 314 implemented on other hosts 310 on the provider network 300, for example for resource instances 314B on host 310B and/or resource instances 314C on host 314C. The VMM 312 (e.g., VMM 312A) encapsulates the client data packets according to the overlay network protocol, includes extended information (e.g., timestamps, client resource instance identifiers, packet sequence numbers, acknowledgement flags, etc.) and sends the overlay network data packets onto the overlay network for delivery to VMMs 312 that monitor the target client resource instances 314 (e.g., VMMs 314B and 314C). See FIG. 5A for an example of an overlay network data packet, according to at least some embodiments. In at least some embodiments, IP tunneling technology may be used at the sending VMM 312 to map IP overlay addresses (public IP addresses) to substrate 302 IP addresses (private IP addresses) and encapsulate or tag the client data packets according to an IP tunneling (or overlay network) protocol for routing via overlay network tunnels 306 between the two namespaces. The encapsulated client data packets may then be delivered to the correct endpoints (receiving VMMs 312) via the tunnels 306 over the network substrate 302; the encapsulation is stripped from the client data packets at the receiving VMMs 312, and the client data packets are delivered to the appropriate resource instances 314.

In at least some embodiments, the sending VMM 312 (e.g., VMM 312A) may also locally record information about some or all of the overlay network data packets that are sent onto the overlay network, for example in a sent packet log as illustrated in FIG. 4. The recorded information for a sent packet may include one or more of, but is not limited to: information uniquely identifying the packet to the VMM 312, such as data stream/sequence number information; a time at which the data packet was sent, referred to as a timestamp; an indication of the VM, client and/or client resource instance that originated the client data packet encapsulated in the overlay network data packet; and an indication of a target of the client data packet.

In at least some embodiments, one or more VMMs 312 (e.g., VMMs 312B and 312C) that receive the overlay network data packets may, in response to each received packet, return an acknowledge message or packet to the sending VMM 312 (e.g., VMM 312A) via the overlay network. See FIGS. 5B and 5C for example overlay network acknowledgement packets, according to at least some embodiments. The acknowledgement packet may include information identifying the overlay network data packet that is being acknowledged, such as a data stream/sequence number identifier. In at least some embodiments, the acknowledgement packet may include additional information, such as a timestamp of when the overlay network data packet was received at the VMM 312 and/or a timestamp of when the acknowledgement packet was sent by the VMM 312. As shown in FIG. 5B, in some cases the overlay network acknowledgement packet may not include client data. However, in other cases the overlay network acknowledgement packet may also include client data (e.g., a client acknowledgement packet).

In some embodiments, as an alternative to sending an acknowledgement message in response to each received packet, only every Nth (e.g., 2nd, 12th, 100th, etc.) received packet may generate an acknowledgment message. For example, an acknowledgement message may only be sent by the receiving VMM 312 in response to a request for acknowledgement from the sending VMM 312. For example, the sending VMM 312 may send a timestamp and sequence number with each packet in a data stream, but only request an acknowledgement message every N packets, for example by setting an acknowledgement request flag in the overlay network packet header of a packet. An indication of N (the number of packets that this request is for) may also be included in the overlay network packet header. Note that N may be, but is not necessarily, a fixed number. The receiving VMM 312 may collect metrics for the received packets and, upon receiving a request for acknowledgement, return statistics for all packets received since the last acknowledgement was made, or for the last N received packets. The returned statistics may include one or more of, but are not limited to, an average or aggregated transit time for the packets and a count of how many packets were actually received. For example, if N=100 as indicated in the request for acknowledgment, and the receiving VMM 312 only received 98 packets since the last request for acknowledgement, then the receiving VMM 312 may indicate in the acknowledgement message that only 98 packets were received. Alternatively, in some embodiments, the receipt time and sequence number for each of the N packets that was received may be returned in the acknowledgement packet.

As previously mentioned, client resource instances 314 on the hosts 310 may communicate with other client resource instances 314 on different hosts 314 according to stateful protocols such as Transmission Control Protocol (TCP) and/or stateless protocols such as User Datagram Protocol (UDP). In communications sessions between client resource instances that use stateful protocols such as TCP, acknowledgement (ACK) messages may be sent from the receiving client resource instance 314 to the sending client resource instance 314. Some embodiments may leverage this aspect of stateful protocols by piggybacking the overlay network protocol acknowledgment messages on client ACK messages being sent back to the sending client resource instance 314. In these embodiments, instead of generating separate acknowledgement messages according to the overlay network protocol, the receiving VMM 312 may detect ACK messages (e.g., TCP ACK messages) being sent from the receiving client resource instance, and include the overlay network analysis information it has collected for one or more received packets in the overlay network header in which the ACK packet is encapsulated. Stateless protocols such as UDP typically do not generate acknowledgement messages, so for data streams between clients in which stateless protocols are used synthetic acknowledgement messages may be generated as previously described.

In at least some embodiments, upon receiving an acknowledgement packet, the sending VMM 312 (e.g., VMM 312A) may use the information included in the packet to locate a corresponding entry (or entries) in the sent packet log. The VMM 312 may then use information in or about the acknowledgement packet (e.g., the time that the acknowledgement packet was received at the VMM 312) and/or information from the corresponding log entry or entries (e.g., the timestamp(s) of when the corresponding packet(s) was sent) to compute one or more performance metrics for the overlay network tunnel 306 over the network substrate 302, for example round-trip time. Note that a tunnel 306 corresponds to a route or path over the network substrate 302 between a client resource instance 314 at the host 310 of the sending VMM 312 (e.g., VMM 312A) and another client resource instance 314 at the host 310 of the receiving VMM 312 (e.g., VMM 312B). Also note that multiple packets may flow over a given tunnel 306 from one client resource instance 314 at one VMM 312 to another client resource instance 314 at another VMM 312.

In some cases, overlay network data packets may be dropped for some reason, and thus the sending VMM 312 may not receive an acknowledgement for a previously sent overlay network data packet. In at least some embodiments, the sending VMM 312 may detect dropped packets, for example according to a time threshold, and record the dropped packets. For example, if a packet recorded in the sent packet log does not receive an acknowledgement within a period specified by the threshold, the VMM 312 may mark the packet as dropped in the sent packet log.

Each VMM 312 in the provider network 300 may act both as a sending and a receiving VMM. Each VMM 312 may track overlay network data packets sent from the respective VMM 312 to other VMMs 312, and record data related to the overlay network client traffic data flow from the VMM 312 to other VMMs 312 as described above. Each VMM 312 may periodically or aperiodically send the collected overlay network traffic data to an overlay network data collection module 322 of an overlay network analysis service 320 on the provider network 300. The data may be sent to the data collection module 322 over an overlay network tunnel according to the IP tunneling protocol, or alternatively the data may be sent over the network substrate according to some other networking protocol, for example TCP or UDP. While not shown, the overlay network analysis service 320 may provide one or more APIs that face the network substrate 302 and/or overlay network via which the VMMs 312 may communicate with the service 320, for example to send the collected overlay network traffic data to the service 320.

In at least some embodiments, the overlay network data collection module 322 may store at least some of the overlay network traffic data collected from the VMMs 312 to a data store 330. Instead or in addition, the overlay network data collection module 322 may provide some or all of the collected data directly to the overlay network analysis module 324.

The overlay network analysis module 324 may obtain overlay network traffic data from the overlay network data collection module 322, from the data store 330, or from both. The analysis module 324 may obtain client-specific traffic data to perform client-level analysis 326. The analysis module 324 may, for example, obtain client-specific traffic data collected by a particular VMM 312 to perform analysis for a specific client resource instance 314, or client-specific traffic data aggregated from multiple VMMs 312 to perform analysis of the specific client's private network implementation as a whole. The analysis module 324 may also obtain aggregated overlay network traffic data from the VMMs 312 to perform aggregate analysis of the overlay network as a whole, or to determine locations or specific components on the network substrate 302 where problems are occurring.

In at least some embodiments, the overlay network analysis module 324 may also obtain network substrate topology information from one or more sources. The network substrate topology information may, for example, indicate the physical configuration or layout of the network substrate 302, as well as information indicating specific components of the network substrate 302 (cable spans, networking devices, etc.) along with location information for each component.

The overlay network analysis module 324 may perform client-level analysis 326 and/or aggregate analysis 328 based on the collected overlay network traffic data and the network substrate topology information. Client-level analysis 326 may be performed using client-specific traffic data aggregated from multiple VMMs 312 over some period. Client-level analysis 326 may be performed to generate a map of the client's private network configuration including the client's resource instances and the connections (tunnels) between the client's resource instances on the overlay network. Client-level analysis 326 may also generate performance metrics or statistics for the generated map of the client's private network configuration, for example average round-trip time, latency, throughput, and packet loss rate statistics for the connections between the client's resource instances based on the overlay network packet data (e.g., round-trip time, dropped packet information, etc.) collected over a period by the sending VMMs 312 according to the overlay network protocol. Client-level analysis 326 may also generate performance metrics or statistics for a client's private network as a whole based on the performance metrics or statistics for the connections between the client's resource instances, for example overall network latency, packet drop rate, and so on. Client-level analysis 326 may also analyze particular data flows between particular client resource instances 314, for example as illustrated in FIG. 4.

Aggregate analysis 328 may be performed using aggregated traffic data from multiple clients and multiple VMMs 312 and the network substrate topology information. Aggregate analysis 328 may be performed to generate a mapping of routes of the overlay network between VMMs 312 over the network substrate 302. Aggregate analysis 328 may also generate performance metrics or statistics for the generated map of the overlay network, for example latency, throughput, and packet loss statistics for the routes between the VMMs 312 or for the overlay network as a whole over a period. In addition, aggregate analysis 328 may determine performance statistics for particular components of the network substrate 302, and to determine specific locations or components on the network substrate where problems may be occurring. For example, performance statistics for two or more routes on the network substrate 302 that traverse common portions of the substrate 302 as determined by the mapping may be analyzed according to a triangulation technique to determine performance statistics for particular components of the network substrate 302 and to pinpoint location(s) on the network substrate where network communications problems (transmission delays contributing to latency, packet loss, etc.) may be occurring.

The overlay network analysis module 324 may generate various overlay network mapping and/or performance reports as output. Client-level analysis 326 of the overlay network analysis module 324 may generate one or more client-level reports as output. Aggregate analysis 328 of the overlay network analysis module 324 may generate one or more aggregate reports as output. Client agents and provider network agents may access the overlay network analysis service 320 via one or more APIs 332 to request and/or view overlay network mapping and/or performance reports generated by the overlay network analysis module 324 of the overlay network analysis service 320. A client agent may access the service 320 via the API(s) 332 to request and view client-level reports 340. The client-level reports 340 may, for example, be provided to the client via an interface on a console in the client's external network, for example a console 1194 on client network 1150 as illustrated in FIG. 11. The client-level reports 340 may be provided via a browser interface or other program on the console. A provider network agent may access the service 320 via the API(s) 332 to request and view aggregate reports 350. The client-level reports 340 may, for example, be provided to the agent via an interface on a console in the provider network. The aggregate reports 340 may be provided via a browser interface or other program on the console. In some embodiments, clients may also be allowed to request and view at least some aggregate reports 340. FIGS. 8A through 8D show examples of client-level and aggregate reports.

In at least some embodiments, client report(s) 340 and aggregate report(s) 350 may be provided via dynamic displays that are periodically or aperiodically updated to report newly analyzed client-specific or aggregate information. Instead or in addition, client report(s) 340 and aggregate report(s) 350 may be generated as periodic or aperiodic reports, or may be generated at the request of an agent of the provider network or an agent of a client via the API(s) 332 to the service.

Data Flow Analysis

FIG. 4 illustrates obtaining and analyzing performance data for a particular tunnel or data flow between client resource instances in a client private network on a provider network, according to at least some embodiments. A client may establish a private network 410 on the provider network. The private network 410 may include multiple client resource instances 414 implemented on VMs monitored by VMMs 412. For example, client resource instance 414A may be monitored by VMM 412A and client resource instance 414B may be monitored by VMM 412B.

Client resource instance 414A may send client data packets to client resource instance 414B. VMM 412A may receive the client data packets, encapsulate the client data packets according to an overlay network protocol, and send the overlay network data packets onto the overlay network implemented on the network substrate 402 according to IP tunneling technology. The overlay network data packets may be routed to VMM 412B according to information in the overlay network packet via a tunnel 406 according to the IP tunneling technology. See FIG. 10 for more information on overlay networks, tunnels, and IP tunneling technology. In addition to the information used in routing, the VMM 412A may include additional information (e.g., acknowledgement flags, timestamps, packet sequence numbers, etc.) in the overlay network packets. See FIG. 5A for an example overlay network data packet, according to at least some embodiments.

Note that there may be one, two, or more separate data flows from client resource instance 414A to client resource instance 414B, each data flow corresponding to a communications session between a particular endpoint of resource instance 414A and a particular endpoint of resource instance 414B, and thus there may be one, two or more tunnels 406 between the two resource instances 414. Further note that client resource instances 414A and 414B may communicate according to stateful protocols such as Transmission Control Protocol (TCP), stateless protocols such as User Datagram Protocol (UDP), or both. Further note that client resource instances 414A and 414B may also communicate with other client resource instances in the client private network 410 via the overlay network, and thus each may be associated with other tunnels over the network substrate 402.

In at least some embodiments, VMM 412A may also record information about some or all of the overlay network data packets in a sent packet log 416. The recorded information may include one or more of, but is not limited to: information uniquely identifying the packet to the VMM 412A, such as data stream/sequence number information; a time at which the data packet was sent, referred to as a timestamp; an indication of the VM, client and/or client resource instance that originated the client data packet encapsulated in the overlay network data packet; and an indication of a target of the client data packet.

Upon receiving the overlay network data packets over tunnel 406, VMM 412B may strip the encapsulation from the client data packets and forward the client data packets to client resource instance 414B. In addition, in at least some embodiments, VMM 412B may return an acknowledgement (ACK) message to VMM 412A via tunnel 406. See FIGS. 5B and 5C for example of overlay network acknowledgement packets, according to at least some embodiments. The acknowledgement packet may include information identifying the overlay network data packet that is being acknowledged, such as a data stream/sequence number identifier. In at least some embodiments, the acknowledgement packet may include additional information, such as a timestamp of when the overlay network data packet was received at the VMM 412B and/or a timestamp of when the acknowledgement packet was sent by the VMM 412B. As shown in FIG. 5B, in some cases the overlay network acknowledgement packet may not include client data. However, in other cases the overlay network acknowledgement packet may also include client data (e.g., a client acknowledgement packet such as a TCP ACK).

As previously noted, in some embodiments, VMM 412B may return an acknowledgement (ACK) message to VMM 412A in response to each received packet. In some embodiments, as an alternative to sending an acknowledgement message in response to each received packet, an acknowledgement message may be sent by VMM 412B every Nth packet, for example only when requested by VMM 412A. In some embodiments, if the communications session between client resource instances 414A and 414B is established according to a stateful protocol (e.g., TCP), VMM 412B may leverage the stateful protocol by piggybacking the overlay network protocol acknowledgment messages on client ACK messages being sent back to the sending client resource instance 414A.

In at least some embodiments, upon receiving an acknowledgement packet from VMM 412B via tunnel 406, VMM 412A may use the information included in the packet to locate a corresponding entry or entries in the sent packet log 416. In at least some embodiments, VMM 412A may then use information in or about the acknowledgement packet (e.g., the time that the acknowledgement packet was received at VMM 412A) and/or information from the corresponding log entry or entries (e.g., the timestamp(s) of when the corresponding packet(s) was sent) to compute one or more performance metrics for the overlay network tunnel 406 over the network substrate 402, for example round-trip time.

Different techniques may be used to calculate round-trip time. For example, in some embodiments, VMM 412A may record a timestamp in the sent packet log 416 for each packet sent on tunnel 406. Upon receiving an acknowledgement packet, VMM 412A may record a timestamp of when the acknowledgement packet was received at VMM 412A in the entry of the log 416 corresponding to the sent packet for which the acknowledgement was received. Round-trip time may be calculated as the difference between the two times. Note that this method does not require a timestamp to be included in the acknowledgement packet.

As an alternative, in some embodiments, VMM 412A may record a timestamp in the sent packet log 416 for each packet sent on tunnel 406. Upon receiving an acknowledgement packet, VMM 412A may read and record a timestamp of when the acknowledgement packet was received in the entry of the log 416 corresponding to the sent packet for which the acknowledgement was received. In addition, the acknowledgement packet may include a timestamp of when the overlay network data packet was received at the VMM 412B and/or a timestamp of when the acknowledgement packet was sent by the VMM 412B. This timestamp information from the acknowledgement packet may also be recorded in the sent packet log 415. Overlay network traversal times for the overlay network data packet and for the acknowledgement packet may then be calculated according to the timestamps. Round-trip time may then be calculated as the sum of the two times. In some embodiments, as an alternative to calculating round-trip time, one-way traversal time for the overlay network data packets may instead be calculated from the timestamp information, for example as the difference between the time sent as recorded in the sent packet log 416 and the time received recorded in the acknowledgement packet. Note that these methods require timestamp(s) to be included in the acknowledgement packet, and also require time synchronization between the VMMs 412. Thus, a time synchronization technique or technology may be used to synchronize time among the host devices that implement the VMMs 412 so that round-trip times can be accurately calculated.

In some cases, overlay network data packets and/or acknowledgement packets may be dropped for some reason, and thus VMM 412A may not receive an acknowledgement packet for a previously sent overlay network data packet. In at least some embodiments, VMM 412A may detect dropped packets, for example according to a time threshold, and record the dropped packets. For example, if a packet recorded in the sent packet log 416 does not receive an acknowledgement within a period specified by the threshold, the VMM 412A may mark the packet as dropped in the sent packet log 416.

In some embodiments, as an alternative to sending an acknowledgement packet in response to each received overlay network data packet, a receiving VMM 412B may instead keep a received packet log where information on received packets is recorded. The recorded information for a received packet may include one or more of, but is not limited to: information uniquely identifying the received packet, such as data stream/sequence number information, a timestamp indicating when the data packet was received, and information indicating which VMM the packet was received from. The VMM 412B may then periodically or aperiodically send information recorded for multiple packets to VMM 412A, for example when VMM 412A periodically or aperiodically requests an acknowledgment packet. Upon receiving the information from VMM 412B, VMM 412A may then compare this information to the information recorded in the sent packet log 416 to calculate performance information for the tunnel 406. Note that since acknowledgement packets are not sent for each packet, round-trip time may not be calculated. Instead, one-way traversal time for the overlay network data packets may be calculated, for example as the difference between the time sent as recorded in the sent packet log 416 and the time received recorded in the information received from VMM 412B. In addition, dropped packets can be determined by comparing the information received from VMM 412B to the sent packet log 416. For example, if a packet recorded in the sent packet log 416 is missing from the information received from VMM 412B, the packet may be marked as dropped.

VMM 412A may send data for each overlay network data packet sent on tunnel 406 to overlay network analysis service 420, or alternatively may periodically or aperiodically send data collected in the sent packet log 416 corresponding to tunnel 406 to overlay network analysis service 420. Overlay network analysis service 420 may collect and store this data, and may perform an analysis of the data over some time interval to generate performance statistics specific to tunnel 406 between client resource instances 414A and 414B, for example latency, throughput, and packet drop rate for tunnel 406. The performance statistics may be output as resource instance data flow report 430, for example to the client via an API to the service 420. FIG. 8A shows an example of a resource instance data flow report, according to at least some embodiments. Note that there may be one, two, or more tunnels from client resource instance 414A to client resource instance 414B, and a separate data flow report 430 may be generated for each tunnel.

In addition, the data received from VMM 412A regarding tunnel 406 may be aggregated with other data received from VMM 412A and/or from other VMMs specific to other tunnels between the client's resource instances 414 on the client private network 410. This aggregated data for the client's resource instances may be analyzed to generate client report(s) 440, for example mappings of the client private network 410 topology indicating resource instances 414 and connections (tunnels) between the instances, and/or performance statistics for the connections (e.g., latency, packet drop rate, throughput, etc.) FIG. 8B shows an example of a client-level report, according to at least some embodiments.

In addition, the client's data may be aggregated with data from one or more other clients. The aggregated data from multiple clients may be analyzed to generate aggregate report(s) 450 for the overlay network, for example mappings of the connections (tunnels) between VMMs 412 and performance statistics for the connections (e.g., latency, packet drop rate, throughput, etc.) The aggregated data may also be used to determine performance statistics for specific components of the network substrate, and to identify problem spots in the network substrate. FIGS. 8C and 8D show example aggregate reports, according to at least some embodiments.

Overlay Network Packets

FIGS. 5A through 5C illustrate an example overlay network data packet and example overlay network acknowledgement packets, according to at least some embodiments. FIG. 5A shows an example overlay network data packet 500, according to at least some embodiments. Packet 500 may include a client data packet 510 encapsulated or tagged according to an overlay network protocol, for example by a sending VMM. The overlay network protocol may include an overlay network header 502. The overlay network protocol may, but does not necessarily, also include an overlay network footer 508. The overlay network header 502 may include overlay network address information 504 that may be used to route the packet 500 on the overlay network to a destination (e.g., to a receiving or target VMM). The sender (e.g., a sending VMM) may fill in this information 504 when encapsulating the client data packet 510. The overlay network header 502 may also include overlay network analysis information 506. Overlay network analysis information 506 may include one or more of, but is not limited to, an acknowledgement flag that indicates this packet 500 is to be acknowledged, a timestamp of when this packet 500 is sent, and a packet sequence number for this packet 500. Analysis information 506 may include other information, for example information identifying a particular data stream/tunnel for this packet 500. In some embodiments, the overlay network header 502 may also include a flag that may be used to indicate whether an acknowledgement message is to be sent in response to this message, and an indication of the number of packets that this request for acknowledgement is for.

FIG. 5B shows an example overlay network acknowledgement packet 520, according to at least some embodiments. The acknowledgement packet 520 may include an overlay network header 522. The acknowledgement packet 520 may, but does not necessarily, also include an overlay network footer 528. The overlay network header 522 may include overlay network address information 524 that may be used to route the packet 520 on the overlay network to a destination (e.g., to a VMM that sent the overlay network data packet 500 for which this acknowledgement packet 520 was generated). The sender (e.g., a VMM that received the overlay network data packet 500 for which this acknowledgement packet 520 is sent) may fill in this information 524. The overlay network header 522 may also include overlay network analysis information 526. Overlay network analysis information 526 may include one or more of, but is not limited to, one or more timestamps (e.g., a timestamp indicating when the data packet 500 was received and/or a timestamp indicating when the acknowledgement packet 520 was sent) and a packet sequence number of the data packet 500 corresponding to this acknowledgement packet 520. Analysis information 526 may include other information, for example information identifying a particular data stream/tunnel of the data packet 500 corresponding to this acknowledgement packet 520.

FIG. 5C shows an example overlay network acknowledgement packet 530 that may be used when piggybacking acknowledgement messages on stateful protocol ACK messages, according to at least some embodiments. In some embodiments, if the communications session between client resource instances is established according to a stateful protocol (e.g., TCP), the overlay network analysis method may leverage the stateful protocol by piggybacking the overlay network protocol acknowledgment messages on client ACK messages being sent back to the sending client resource instance. In these cases, in addition to being encapsulated or tagged with an overlay network header 532 including address information 534 and analysis information 536 and an optional overlay network footer 538, encapsulated client data (e.g. a client acknowledgement packet 540) may also be included in the overlay network packet.

Analysis Methods

Figure 6:
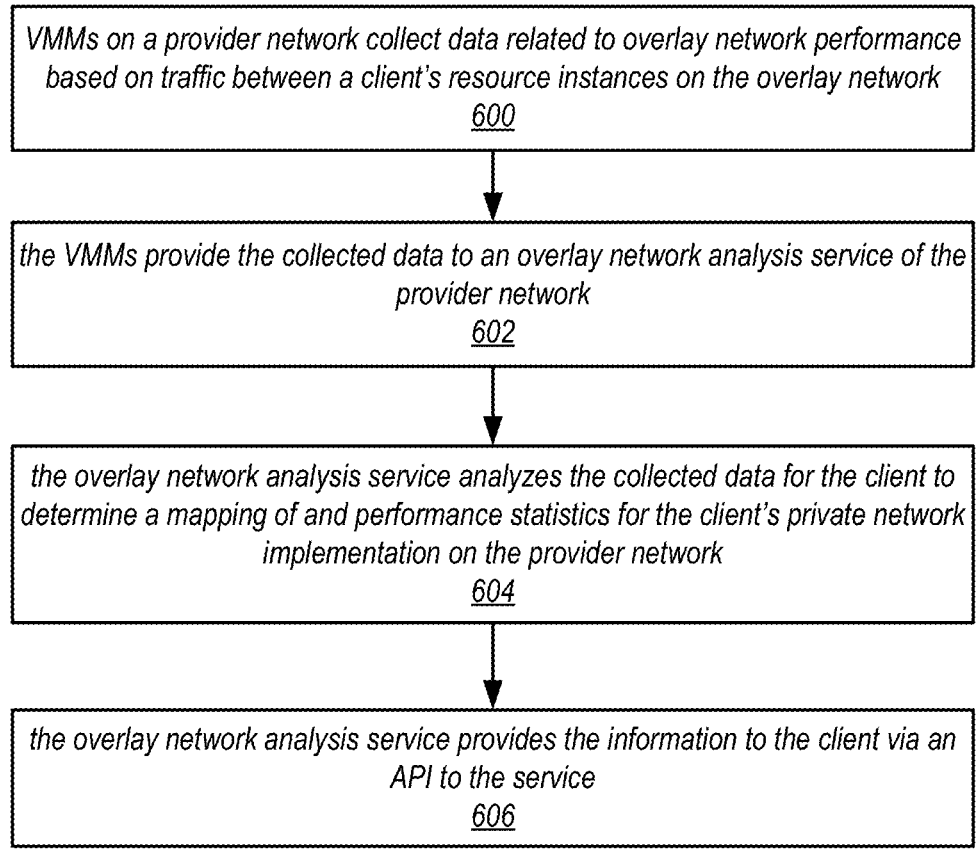
FIG. 6 is a flowchart of a method for analyzing performance for a client's private network implementation on an overlay network according to the client's overlay network traffic, according to at least some embodiments.
Figure 7:
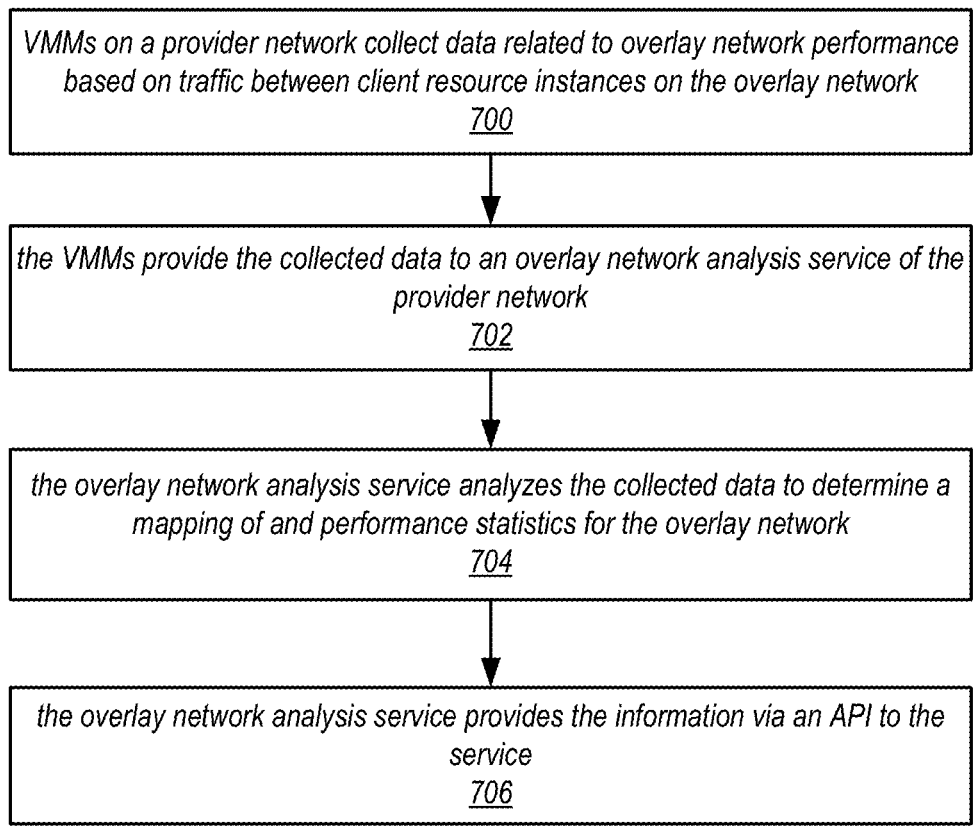
FIG. 7 is a flowchart of a method for mapping and analyzing performance of an overlay network according to aggregated client network traffic, according to at least some embodiments.

FIGS. 6 through 8 are flowcharts of several methods for collecting and analyzing overlay network client traffic to determine overlay network performance and other information at various levels, according to at least some embodiments. These methods are based on the general method as illustrated in FIGS. 1 and 2, and are not intended to be limiting.

FIG. 6 is a flowchart of a method for analyzing performance for a client's private network implementation on an overlay network according to the client's overlay network traffic, according to at least some embodiments. Client-level analysis may be performed according to data specific to a particular client's resources instances collected over a period to generate performance, health, and/or other information specific to the client's provider network implementation, for example for a client's virtualized private network as illustrated in FIGS. 4 and 12.

As indicated at 600 of FIG. 6, one or more VMMs on a provider network may collect data related to overlay network performance based on traffic between a particular client's resource instances on the overlay network. The data may correspond to overlay network packet traffic on tunnels between particular client resource instances, for example as illustrated in FIG. 4. The collected data may include round-trip time, for example calculated from data packets and acknowledgement packets on the tunnels. Instead or in addition, the collected data may include one-way traversal time for the overlay network data packets. The collected data may also include indications of dropped packets. The data may, for example, be recorded in a sent packet log, for example as shown in FIG. 4.

As indicated at 602 of FIG. 6, the VMMs may periodically or aperiodically provide the collected data to an overlay network analysis service of the provider network. The data may be sent to the overlay network analysis service over an overlay network tunnel according to the IP tunneling protocol, or alternatively the data may be sent over the network substrate according to some other networking protocol, for example TCP or UDP. In at least some embodiments, the overlay network analysis service may provide one or more APIs that face the network substrate and/or overlay network via which the VMMs may communicate with the service, for example to send the collected overlay network traffic data to the service.

As indicated at 604 of FIG. 6, the overlay network analysis service analyzes the collected data for the client to determine a mapping of and performance statistics for the client's private network implementation on the provider network. For example, the round-trip or one-way transit time collected for each tunnel may be analyzed to determine latency for the tunnel. As another example, the data may be analyzed to determine a packet drop rate for the tunnel. Calculated performance metrics for the tunnels may be analyzed to determine performance statistics for the entire private network implementation, for example overall latency and/or packet drop rate.

As indicated at 606 of FIG. 6, the overlay network analysis service may provide the information for the client's private network implementation generated by the analysis to the client via an API to the service. For example, the client-specific information may be provided to the client via an interface on a console in the client's external network, for example a console 1194 on client network 1150 as illustrated in FIG. 11.

FIG. 7 is a flowchart of a method for mapping and analyzing performance of an overlay network according to aggregated client network traffic, according to at least some embodiments. Aggregate analysis may be performed according to data collected for multiple clients over some period to generate mapping, performance, health, and/or other information for the overlay network as a whole.

As indicated at 700 of FIG. 7, VMMs on a provider network collect data related to overlay network performance based on traffic between clients' resource instances on the overlay network. The data may correspond to overlay network packet traffic on tunnels between client resource instances, for example as illustrated in FIG. 4. The collected data may include round-trip time, for example calculated from data packets and acknowledgement packets on the tunnels. Instead or in addition, the collected data may include one-way traversal time for the overlay network data packets. The collected data may also include indications of dropped packets. The data collected for all clients on a VMM may, for example, be recorded in a sent packet log or logs, for example as shown in FIG. 4.

As indicated at 702 of FIG. 7, the VMMs may periodically or aperiodically provide the collected data to an overlay network analysis service of the provider network. The data may be sent to the overlay network analysis service over an overlay network tunnel according to the IP tunneling protocol, or alternatively the data may be sent over the network substrate according to some other networking protocol, for example TCP or UDP. In at least some embodiments, the overlay network analysis service may provide one or more APIs that face the network substrate and/or overlay network via which the VMMs may communicate with the service, for example to send the collected overlay network traffic data to the service.

As indicated at 704 of FIG. 7, the overlay network analysis service analyzes the collected data for some or all of the clients to determine a mapping of and performance statistics for the overlay network as a whole. For example, performance information (e.g., latency and packet drop rates) may be calculated for all of the clients' tunnels between VMMs. The calculated performance information for the tunnels may be collectively analyzed to determine performance statistics between particular VMMs and/or for the entire overlay network, for example overall latency and/or packet drop rate. A mapping of routes of the overlay network between VMMs over the network substrate may be generated according to the aggregated data and network substrate topology information. Performance statistics for particular components of the network substrate may be generated. For example, performance statistics for two or more routes on the network substrate that traverse common portions of the substrate as determined by the mapping may be analyzed according to a triangulation technique to determine performance statistics for particular components of the network substrate, and to determine specific locations or components on the network substrate where problems may be occurring.

As indicated at 706 of FIG. 7, the overlay network analysis service may provide the overlay network information, generated by the analysis of the data aggregated for multiple clients, via an API to the service. For example, the information may be provided to an agent of the provider network via an interface on a console in the provider network.

Analysis Output

FIGS. 8A through 8D illustrate example outputs for an overlay network analysis method according to at least some embodiments, and are not intended to be limiting. FIGS. 8A and 8B are examples of client-level reports, and FIGS. 8C and 8D are examples of aggregate-level reports. Embodiments may output the client-level and aggregate reports in graphical and/or textual formats. The reports may be output as static reports, or alternatively may be displayed and updated dynamically as new data is received and analyzed.

FIG. 8A illustrates an example resource instance data flow report as shown in FIG. 4 according to at least some embodiments. An identification field 800 may indicate a source resource instance A and a destination resource instance B for the data flow, and may also include information identifying the particular data flow between the resource instances. The resource instance data flow report may include fields indicating the calculated throughput 802, latency 804, and packet loss rate 806 for the data flow or tunnel. There may be two or more tunnels between a source resource instance A and a destination resource instance B. Separate resource instance data flow reports as shown in FIG. 8A may be generated, and may be singly or collectively displayed. In addition, resource instance data flow reports may be generated for other resource instances and singly or collectively displayed.

FIG. 8A is intended to represent performance statistics for a particular data flow or tunnel between two resource instances. However, in at least some embodiments, performance statistics from multiple tunnels between two resource instances may be combined to generate overall data flow statistics between two resource instances.

FIG. 8B illustrates an example client-level report according to at least some embodiments. This example shows a graphical mapping of an example client private network implementation on the provider network generated according to an analysis of the client's aggregated packet traffic data between the client's resource instances on the overlay network. Client resource instances 814A through 814E are shown. Connections or data flows between the client resource instances 814 are shown as tunnels 806A through 806G. Each resource instance 814 may be an endpoint for tunnels 806 to one, two, or more other resource instances 814. In addition, there may be two or more tunnels 806 between two given resource instances 814, such as tunnels 806C and 806D between client resource instance 814A and 814B. Performance statistics, for example as shown in FIG. 8A, for individual tunnels 806 may be displayed adjacent to the respective tunnels 806. In at least some embodiments, the client-level report may be interactive. For example, a user may select a particular tunnel 806 or resource instance 814 to display performance statistics for the tunnel 806 or resource instance 814.

FIG. 8C illustrates an example aggregate report for a route between VMMs on the provider network according to at least some embodiments. The report may be generated according to an analysis of aggregate data flow information for all tunnels on the overlay network between the two VMMs. An identification field 830 may indicate a source VMM A and a destination VMM B for the route, and may also include information identifying the particular route between the VMMs. The route aggregate report may include fields indicating the calculated throughput 832, latency 834, and packet loss rate 836 for the route.

FIG. 8D illustrates an example aggregate report for an overlay network, according to at least some embodiments. An overlay network-level aggregate report may be generated according to an analysis of aggregate data flow information for some or all tunnels on the overlay network between the VMMs in combination with topology information for the network substrate on which the overlay network is implemented. This example shows a graphical representation of a mapping of an example overlay network implementation on the network substrate of a provider network generated according to an analysis of aggregated data from multiple clients on the overlay network.

FIG. 8D shows a graphical representation of example host devices with virtual machine monitors (Host/VMMs 812A through 812C) on the provider network, as well as routes 820 between the hosts/VMMs 812. There may be one or more routes 820 (e.g., routes 820A through 820E) between each pair of hosts/VMMs 812. The circles represent nodes (e.g., network devices) on the network substrate, such as routers, switches, etc. The lines between the hosts/VMMs 812 and the nodes represent connections or links between nodes or between nodes and host devices, for example fiber-optic connections. Note that two or more routes 820 may pass through a given node. For example, routes 820D and 820E both pass through node 822A, and routes 820C and 820E both pass through node 822B. In addition, two routes 820 may share a connection (e.g., a fiber-optic cable). For example, routes 820C and 820E share a connection between node 822B and host/VMM 812B. Performance statistics for routes 820, for example as shown in FIG. 8C, may be displayed adjacent to the respective routes. In at least some embodiments, the aggregate report may be interactive. For example, a user may select a particular route 820 or host/VMM 812 to display performance statistics for the respective route 820 or host/VMM 812. In addition, performance statistics for nodes and connections may be calculated according to the aggregate analysis, and may be displayed on the aggregate report with the respective nodes and connections or accessed interactively. In at least some embodiments, problem nodes or connections may be identified according to the aggregate analysis and indicated on the aggregate report, for example using visual (e.g., color), textual, or other indications.

Example Provider Network Environments

This section describes example provider network environments in which embodiments of the network traffic mapping and performance analysis methods and apparatus may be implemented. However, these example provider network environments are not intended to be limiting.

Figure 9:
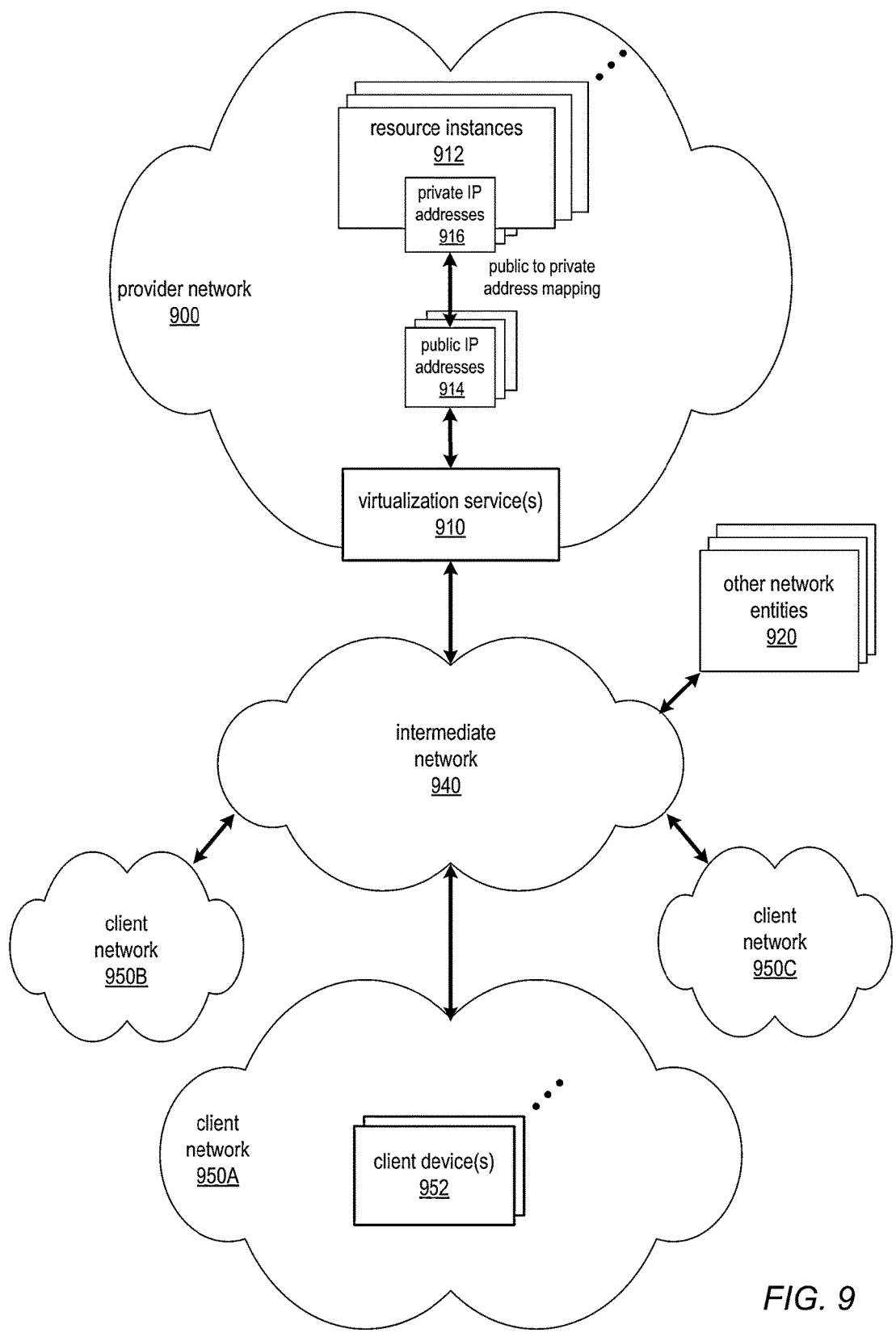
FIG. 9 illustrates an example provider network environment, according to at least some embodiments.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 10:
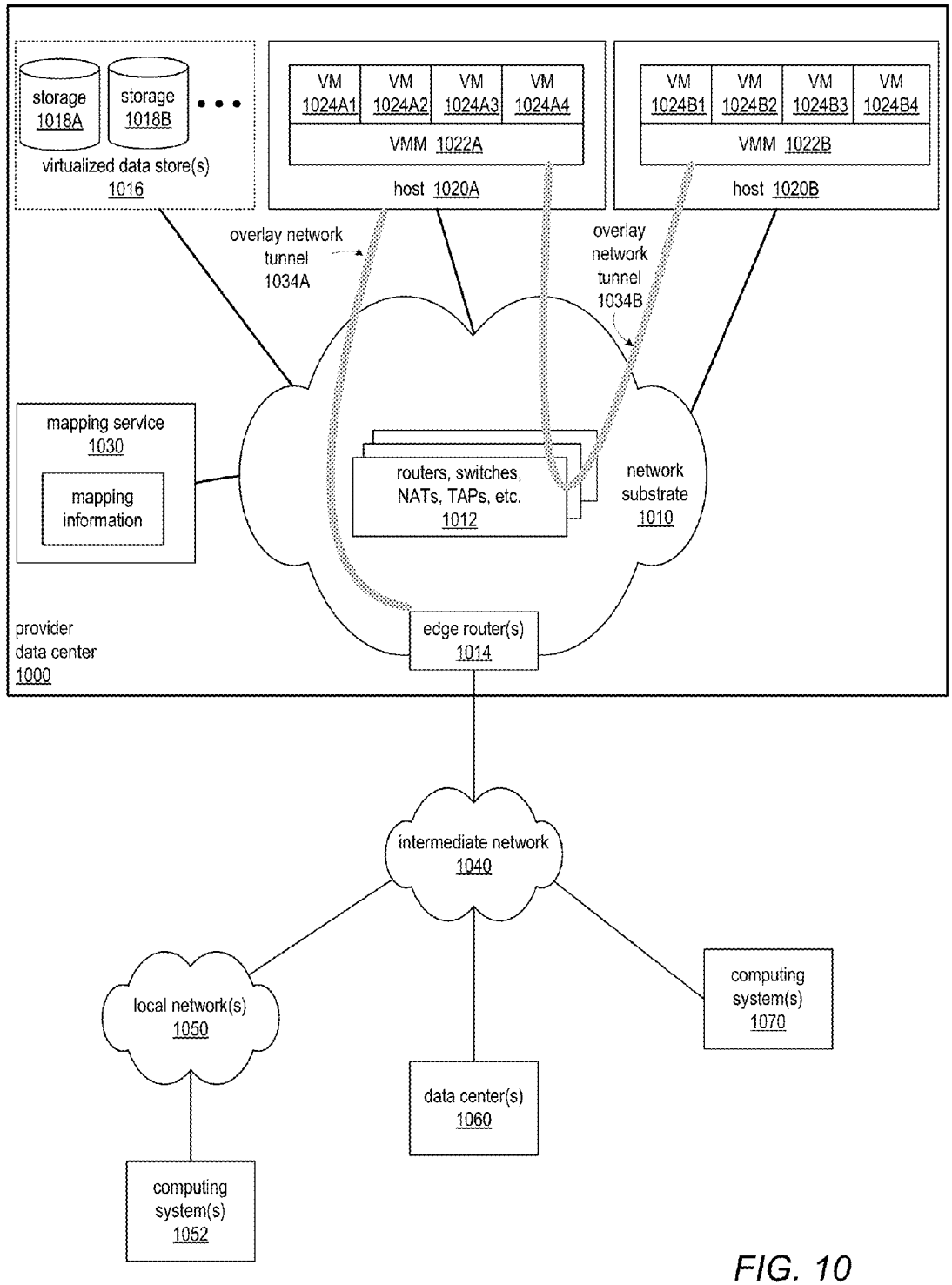
FIG. 10 illustrates an example data center that implements an overlay network on a network substrate using IP tunneling technology, according to some embodiments.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

FIG. 11 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 12 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other peering connection over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnets 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

Illustrative System

In at least some embodiments, a server that implements a portion or all of the network traffic mapping and performance analysis methods and apparatus as described herein may include a general-purpose computer system that includes or is configured to access one or more computer-accessible media, such as computer system 2000 illustrated in FIG. 13. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the network traffic mapping and performance analysis methods and apparatus, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 12 for implementing embodiments of a network traffic mapping and performance analysis method. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A provider network, comprising;
   a network substrate;
   a plurality of multi-tenant host devices, wherein each host device includes a plurality of client resource instances, wherein each client resource instance is assigned to one of a plurality of clients of the provider network, and wherein at least two client resource instances on at least one host device are assigned to different ones of the plurality of clients; and
   one or more computing devices implementing an overlay network analysis service;
   wherein each host device is configured to determine performance data for one or more overlay network tunnels, wherein each overlay network tunnel carries overlay network packets from a respective host device to another one of the host devices over the network substrate, wherein each overlay network packet on the respective overlay network tunnel includes client data obtained from one of the client resource instances on the respective host device and targeted at one of the client resource instances on the other host device and overlay network metadata including information for routing the client data over the network substrate via the respective overlay network tunnel;
   wherein the plurality of host devices are configured to determine the performance data for the one or more overlay network tunnels according to analysis information included in the overlay network metadata of the overlay network packets that include client data;
   wherein the performance data includes round-trip times on the one or more overlay network tunnels determined by the plurality of host devices for the overlay network packets that include client data delivered via the overlay network tunnels; and
   wherein the overlay network analysis service is configured to:
   obtain the performance data from the plurality of host devices;
   generate mappings of different clients' private network implementations according to the performance data, wherein a particular mapping indicates a group of client resource instances in a private network implementation of a particular client and overlay network tunnels between the group of client resource instances; and
   generate performance information for the overlay network according to the obtained performance data, wherein the performance information includes a latency metric for the overlay network tunnels calculated according to the round-trip times determined for overlay network packets delivered via the overlay network tunnels.

2. The provider network as recited in claim 1, wherein the performance data determined for an overlay network tunnel further indicates dropped packets for the overlay network tunnel, and wherein the performance information further includes a packet loss rate calculated for at least one overlay network tunnel according to the indication of dropped packets for the overlay network tunnel.

3. The provider network as recited in claim 1, wherein each host device is further configured to, for at least one of the overlay network packets that include client data sent via an overlay network tunnel to another host device:
   record a sent time indicating when the overlay network packet that includes client data was sent on the overlay network tunnel;
   receive an acknowledgement of receipt of the overlay network packet that includes client data from the other host device via the overlay network tunnel; and
   calculate a round-trip time for the overlay network packet that includes client data according to the recorded sent time and the acknowledgement.

4. The provider network as recited in claim 1, wherein each host device is further configured to, for two or more overlay network packets sent via an overlay network tunnel to another host device:
   receive a single acknowledgement message for the two or more overlay network packets from the other host device via the overlay network tunnel; and
   determine performance data for the two or more overlay network packets according to the single acknowledgement message.

5. The provider network as recited in claim 1, wherein the performance data obtained by the overlay network analysis service comprises performance data determined for the one or more overlay network tunnels between the group of client resource instances in the private network implementation of the particular client on the provider network, and wherein the performance information is generated for the particular client's private network implementation on the provider network.

6. The provider network as recited in claim 1, wherein the overlay network analysis service is further configured to generate a report including a graphical mapping of the particular client's private network implementation according to the performance data, wherein the graphical mapping is generated according to the particular mapping.

7. The provider network as recited in claim 1, wherein the performance data obtained by the overlay network analysis service includes performance data determined for overlay network tunnels between client resource instances of two or more of the plurality of clients, and wherein the performance information is generated according to aggregated performance data for the two or more of the plurality of clients.

8. The provider network as recited in claim 7, wherein the overlay network analysis service is further configured to:
   generate another mapping of the overlay network according to the aggregated performance data and topology information for the network substrate, wherein the other mapping indicates the plurality of host devices and routes over the network substrate between the plurality of host devices; and
   generate performance metrics for each of one or more components of the network substrate according to the aggregated performance data and the topology information.

9. A method, comprising:
   obtaining, by a service implemented on one or more computing devices on a provider network, performance data for client data packets sent over an overlay network on a network substrate between different hosts in the provider network, wherein each client data packet is tagged by a respective host with overlay network metadata including information for routing the client data packet over the network substrate via the overlay network, wherein the performance data is determined by the hosts according to analysis information included in the overlay network metadata tagged to the client data packets by the hosts;
   generating mappings of different clients' private network implementations according to the performance data, wherein a particular mapping indicates a group of client resource instances in a private network implementation of a particular client and overlay network routes between the group of client resource instances in the private network implementation;
   determining one or more performance metrics for the overlay network according to the performance data, wherein the one or more performance metrics include a latency metric for each of one or more overlay network routes over the network substrate; and
   generating output indicating the one or more performance metrics for the overlay network.

10. The method as recited in claim 9, wherein each host includes a plurality of client resource instances, wherein each client resource instance is assigned to one of a plurality of clients of the provider network, and wherein at least two client resource instances on at least one host are assigned to different clients of the provider network.

11. The method as recited in claim 10, wherein the plurality of client resource instances are implemented as virtual machines (VMs) on the hosts, wherein each host includes a virtual machine monitor (VMM) that monitors the plurality of virtual machines (VMs) on the respective host and sends tagged client data packets originating at client resource instances on the host over the network substrate via overlay network routes.

12. The method as recited in claim 10, wherein determining the performance data by the hosts comprises, at each host, determining performance data for client data packets originating at one or more client resource instances at the respective host and tagged with overlay network metadata according to an overlay network protocol at the respective host for delivery as overlay network packets to one or more other client resource instances at one or more other hosts via respective overlay network routes.

13. The method as recited in claim 12, wherein determining the performance data at each host comprises, for each of one or more of the overlay network packets sent via an overlay network route to another host:
   recording, by a sending host, a sent time indicating when the overlay network packet was sent on the overlay network route;
   receiving, by the sending host, an acknowledgement of receipt of the overlay network packet from the other host via the overlay network route; and calculating, by the sending host, a round-trip time for the overlay network packet on the overlay network route according to the recorded sent time and the acknowledgement.

14. The method as recited in claim 12, wherein determining the performance data at each host comprises, for overlay network packets sent via an overlay network route to another host:
  requesting, by a sending host, an acknowledgement message from the other host at every Nth overlay network packet sent to the other host;
  receiving, by the sending host, a single acknowledgement message from the other host indicating receipt of two or more of the N sent overlay network packets; and
  determining, by the sending host, performance data for the N sent overlay network packets according to the single acknowledgement message.

15. The method as recited in claim 12, wherein determining the performance data at each host comprises, for at least one overlay network packet sent via an overlay network route to another host, receiving, by a sending host, an acknowledgement of receipt of the overlay network packet from the other host via the overlay network route.

16. The method as recited in claim 15, wherein the acknowledgement of receipt is included with a client acknowledgement packet tagged with overlay network metadata at the other host for routing the client acknowledgement packet over the network substrate to the sending host via the overlay network.

17. The method as recited in claim 9, wherein the performance data includes round-trip times determined for each overlay network route, and wherein the latency metric for each overlay network route is determined from the round-trip times for the respective overlay network route.

18. The method as recited in claim 9, wherein the one or more performance data indicates dropped packets for the overlay network routes, and wherein the performance metrics determined for each overlay network route further include a packet loss rate calculated according to the indication of dropped packets for the respective overlay network route.

19. The method as recited in claim 9, wherein the performance data obtained by the service comprises performance data determined for the overlay network routes between the group of client resource instances in the private implementation of the particular client on the provider network, and wherein the one or more performance metrics are determined for the particular client's private network implementation on the provider network.

20. The method as recited in claim 9, wherein generating output indicating the one or more performance metrics for the overlay network comprises generating a graphical mapping of the particular client's private network implementation according to the performance data, wherein the graphical mapping is generated according to the particular mapping.

21. The method as recited in claim 9, wherein the performance data obtained by the service includes performance data determined for overlay network routes between client resource instances of two or more of a plurality of clients of the provider network, and wherein the one or more performance metrics are determined according to aggregated performance data for the two or more clients.

22. The method as recited in claim 21, further comprising generating another mapping of the overlay network according to the aggregated performance data and topology information for the network substrate, wherein the other mapping indicates the hosts and routes over the network substrate between the hosts.

23. The method as recited in claim 21, further comprising generating performance metrics for each of one or more components of the network substrate according to the aggregated performance data and topology information for the network substrate.

24. A non-transitory computer-accessible storage medium storing program instructions computer-executable to implement:
  collecting performance data for client data packets sent over a network substrate via an overlay network between different hosts in a provider network, wherein the performance data includes round-trip times determined for overlay network packets delivered via the overlay network, wherein an overlay network packet is a client data packet encapsulated by a respective host according to an overlay network protocol for routing over the overlay network, wherein the performance data is determined by the hosts according to analysis information included in the overlay network protocol encapsulation of the client data packets;
  generating mappings of different clients' private network implementations according to the performance data, wherein a particular mapping indicates a group of client resource instances in a private network implementation of a particular client and overlay network routes between the group of client resource instances in the private network implementation;
  determining performance information for the overlay network according to the performance data, wherein the performance information include a latency metric for each of one or more overlay network routes, wherein the latency metric for each overlay network route is determined from the round-trip times for the respective overlay network route; and
  generating output indicating the performance information for the overlay network.

25. The non-transitory computer-accessible storage medium as recited in claim 24, wherein each host includes a plurality of client resource instances, wherein each client resource instance is assigned to one of a plurality of clients of the provider network, and wherein at least two client resource instances on at least one host are assigned to different clients of the provider network.

26. The non-transitory computer-accessible storage medium as recited in claim 24, wherein the collected performance data further indicates dropped packets for the overlay network routes, and wherein the performance information further includes a packet loss rate for each of the one or more of the overlay network routes calculated according to the indication of dropped packets for the respective overlay network route.

27. The non-transitory computer-accessible storage medium as recited in claim 24, wherein the collected performance data comprises performance data determined for overlay network routes between client resource instances in the private network implementation of the particular client on the provider network, and wherein the performance information is determined for the particular client's private network implementation on the provider network.

28. The non-transitory computer-accessible storage medium as recited in claim 24, wherein the collected performance data includes performance data determined for overlay network routes between client resource instances of two or more of a plurality of clients of the provider network, and wherein the performance information is determined according to aggregated performance data for the two or more clients.

29. The non-transitory computer-accessible storage medium as recited in claim 24, wherein the program instructions are further computer-executable to implement generating another mapping of the overlay network according to the collected performance data and topology information for the network substrate, wherein the other mapping indicates the hosts and the overlay network routes between the hosts over the network substrate between the hosts.

30. The non-transitory computer-accessible storage medium as recited in claim 24, wherein the program instructions are further computer-executable to implement generating performance metrics for each of one or more components of the network substrate according to the collected performance data and topology information for the network substrate.

\* \* \* \* \*